(12) United States Patent (10) Patent No.: US 11,594,851 B2
Kozlov et al. (45) Date of Patent: Feb. 28, 2023

(54) RING OPTICAL RESONATOR FOR GENERATION AND DETECTION OF MILLIMETER-WAVE OR SUB-MILLIMETER-WAVE ELECTROMAGNETIC RADIATION

(71) Applicant: Microtech Instruments, Inc., Lorton, VA (US)

(72) Inventors: Vladimir G. Kozlov, Lorton, VA (US); David S. Alavi, Eugene, OR (US)

(73) Assignee: Microtech Instruments, Inc., Lorton, VA (US)

( * ) Notice: Subject to any disclaimer, the term of this patent is extended or adjusted under 35 U.S.C. 154(b) by 0 days.

(21) Appl. No.: 17/677,888

(22) Filed: Feb. 22, 2022

(65) Prior Publication Data

US 2022/0271489 A1 Aug. 25, 2022

Related U.S. Application Data

(60) Provisional application No. 63/152,816, filed on Feb. 23, 2021.

(51) Int. Cl.
*H01S 3/083* (2006.01)
*H01S 3/063* (2006.01)

(52) U.S. Cl.
CPC ............ *H01S 3/083* (2013.01); *H01S 3/0637* (2013.01)

(58) Field of Classification Search
CPC .... H01S 3/083; H01S 3/0637; G02F 2203/15; G02F 1/365; H03B 17/00
See application file for complete search history.

(56) References Cited

U.S. PATENT DOCUMENTS 9,377,362 B2 6/2016 Kozlov et al.
9,574,944 B1 2/2017 Kozlov et al.
(Continued)

OTHER PUBLICATIONS

International Search Report and Written Opinion dated Jun. 7, 2022 for counterpart App No. PCT/US2022/017399.
(Continued)

*Primary Examiner* — Yuanda Zhang
(74) *Attorney, Agent, or Firm* — David S. Alavi

(57) ABSTRACT

A ring optical resonator and one or more input optical waveguides are arranged on a substrate, and are arranged and positioned to establish evanescent optical coupling between them. The ring optical resonator, the substrate, or both include one or more nonlinear optical materials. To detect an electromagnetic signal at frequency $v_{EM}$ incident on the resonator, an input optical signal at frequency $v_{IN}$ propagates along the waveguide and around the resonator. The incident electromagnetic signal and the input optical signal generate one or more sideband optical signals at corresponding optical sideband frequencies $v_{SF}=v_{IN}+v_{EM}$ or $v_{DF}=v_{IN}-v_{EM}$. To generate an electromagnetic signal to propagate away from the resonator, input optical signals at frequencies $v_{IN1}$ and $v_{IN2}$ propagate along one or more waveguides and around the resonator and generate the electromagnetic signal incident at frequency $v_{EM}=|v_{IN1}-v_{IN2}|$.

38 Claims, 19 Drawing Sheets

(56) References Cited

U.S. PATENT DOCUMENTS

| | | | |
|---|---|---|---|
| 9,755,395 B2* | 9/2017 | Liang | H01S 3/1307 |
| 11,262,639 B2 | 3/2022 | Kozlov | |
| 2008/0212974 A1 | 9/2008 | Davies et al. | |
| 2008/0266573 A1 | 10/2008 | Choi et al. | |
| 2009/0028492 A1 | 1/2009 | Wu et al. | |
| 2017/0248832 A1* | 8/2017 | Kippenberg | G02F 1/353 |
| 2018/0095003 A1 | 4/2018 | Vahala et al. | |
| 2020/0401012 A1 | 12/2020 | Xu et al. | |
| 2021/0373362 A1* | 12/2021 | Okawachi | H01S 5/005 |

OTHER PUBLICATIONS

Zhang et al; Monolithic ultra-high-Q lithium niobate microring resonator; Optica, vol. 4 No. 12 p. 1536 (2017).

Yao et al; Integrated Silicon Photonic Microresonators: Emerging Technologies; IEEE Journal of Selected Topics in Quantum Electronics, vol. 24 No. 6 p. 5900324 (2018).

Ahmed et al; Electro-Optically Tunable Modified Racetrack Resonator in Hybrid Si3N4—LiNbO3; Advanced Photonic Congress, Paper No. IM3A.5 (2019).

Ahmed et al; Tunable hybrid silicon nitride and thin-film lithium niobate electro-optic microresonator; Optics letters, vol. 44 No. 3 p. 618 (2019).

Shao et al; Microwave-to-optical conversion using lithium niobate thin-film acoustic resonators; Optica, vol. 6, No. 12 p. 1498 (2019).

\* cited by examiner

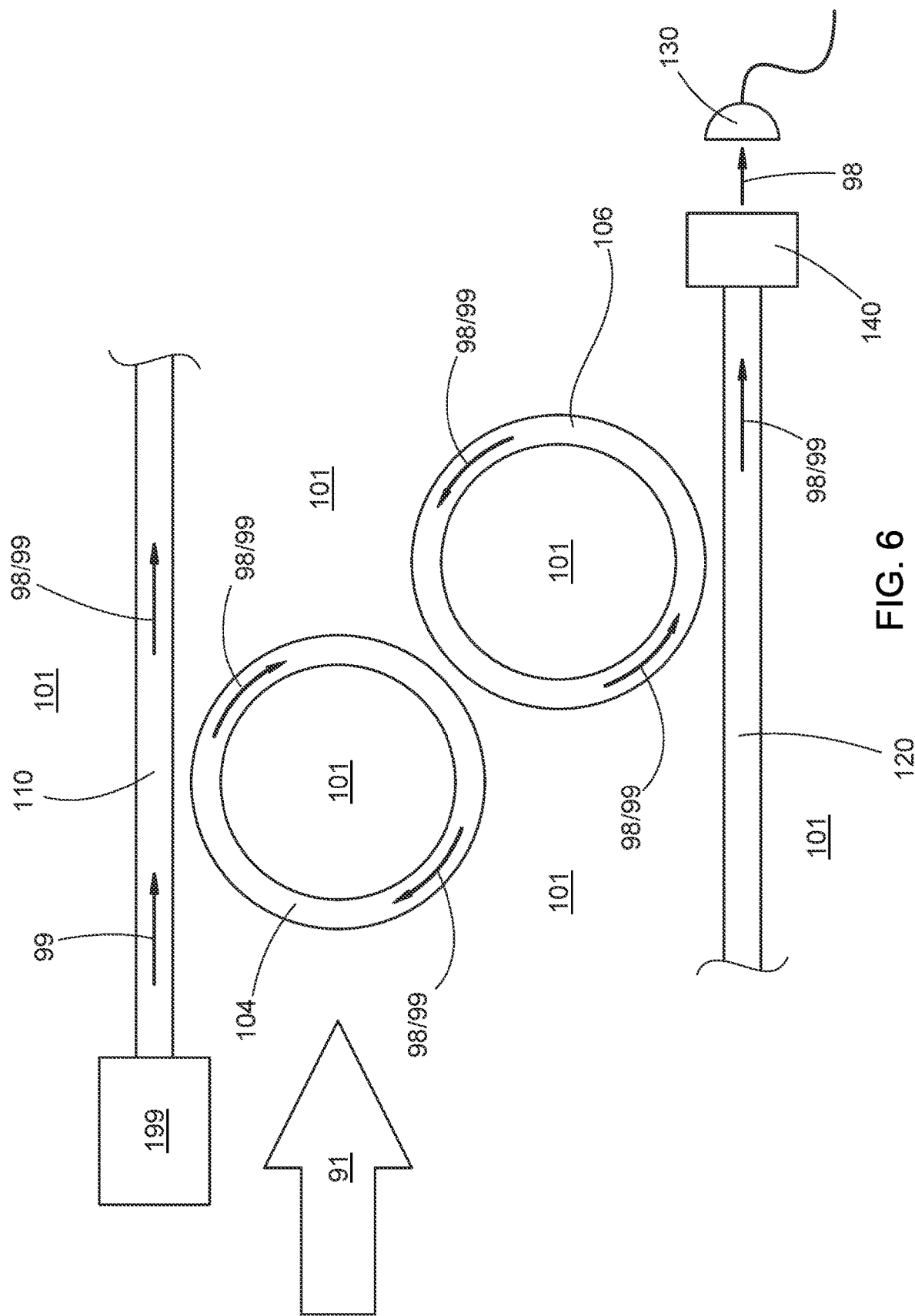

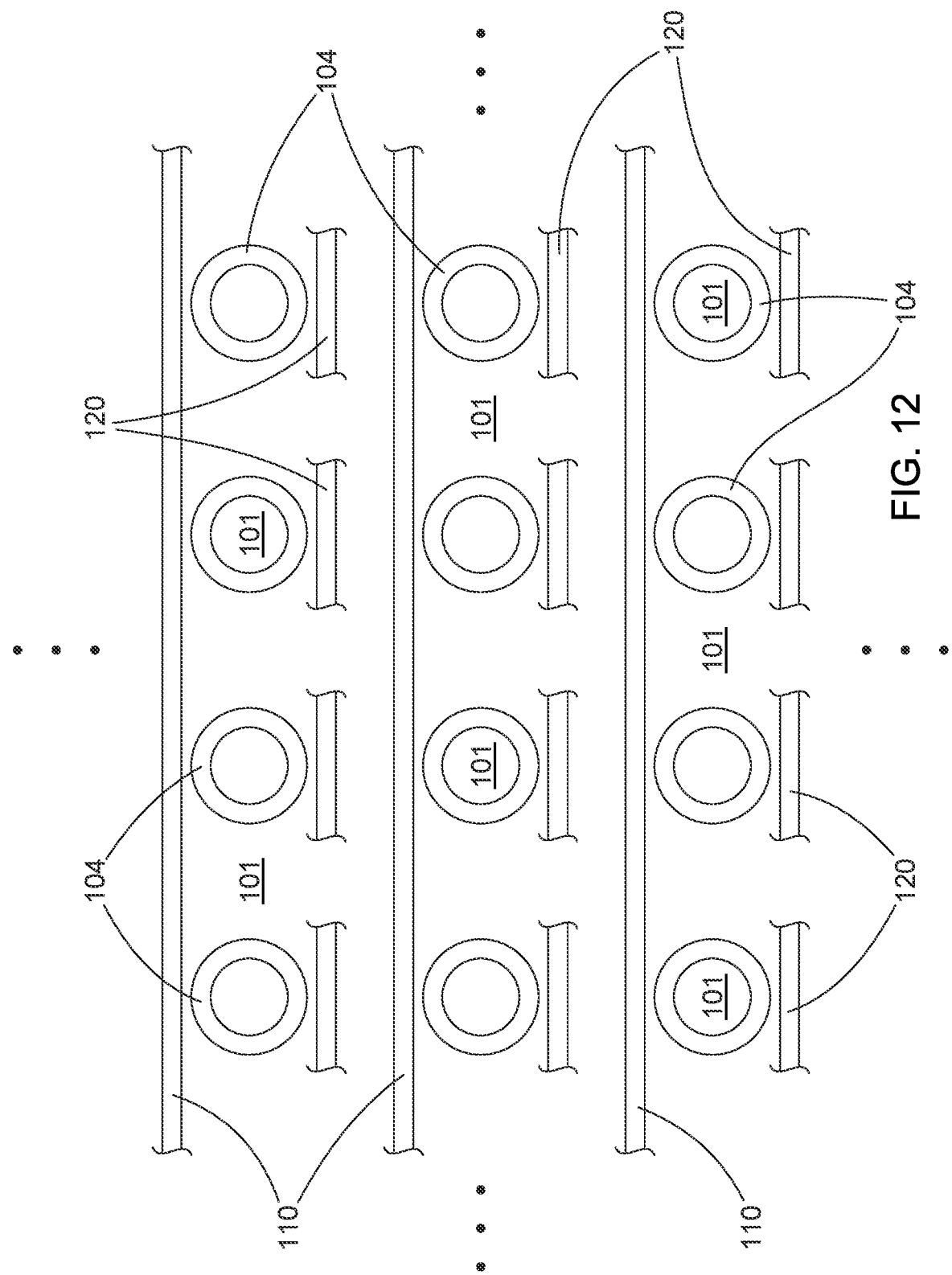

RING OPTICAL RESONATOR FOR GENERATION AND DETECTION OF MILLIMETER-WAVE OR SUB-MILLIMETER-WAVE ELECTROMAGNETIC RADIATION

BENEFIT CLAIM

This application claims benefit of U.S. provisional App. No. 63/152,816 entitled "Optical upconversion of millimeter-wave or sub-millimeter-wave electromagnetic radiation using a ring optical resonator" filed Feb. 23, 2021 in the names of Kozlov et al, said provisional application being incorporated by reference as if set forth herein in its entirety.

FIELD OF THE INVENTION

The field of the present invention relates to generation and detection of millimeter-wave or sub-millimeter-wave electromagnetic radiation. In particular, apparatus and methods are disclosed that include generation and detection of millimeter-wave or sub-millimeter-wave electromagnetic radiation using a ring optical resonator.

SUMMARY

A first inventive apparatus includes a ring optical resonator and an input optical waveguide on a substrate. The ring optical resonator is arranged so as to support one or more resonant optical modes; the input optical waveguide is arranged so as to support one or more propagating input optical modes. The input optical waveguide and the ring optical resonator are arranged and positioned so as to establish evanescent optical coupling between them. The ring optical resonator, the substrate, or both include one or more nonlinear optical materials. An input optical signal at an input optical frequency $v_{IN}$ propagates along the input optical waveguide in one or more propagating input optical modes and around the ring optical resonator in one or more resonant optical modes. A millimeter-wave or sub-millimeter-wave electromagnetic signal at an electromagnetic frequency $v_{EM}$ is incident on the ring optical resonator. The ring optical resonator and the input optical waveguide are arranged so as to generate, from the input optical signal and the electromagnetic signal, one or more sideband optical signals that propagate around the ring optical resonator at corresponding optical sideband frequencies $v_{SF}=v_{IN}+v_{EM}$ or $v_{DF}=v_{IN}-v_{EM}$.

In various examples the first inventive apparatus can further include one or more among (i) an optical detector for receiving one or more of the sideband optical signals, (ii) an output optical waveguide for guiding one or more of the sideband optical signals, (iii) one or more additional ring optical resonators, (iv) a source of the input optical signal, (v) a frequency-locking mechanism coupling the input optical signal source and the ring optical resonator, or (vi) one or more electrical traces acting as an antenna. In some examples an array of ring optical resonators can be employed to act as an imaging array for the electromagnetic signal.

An inventive method for using the first inventive apparatus includes arranging for the electromagnetic signal to be incident on the ring optical resonator; and launching the input optical signal to propagate along the input optical waveguide. In various examples an inventive method for using the first inventive apparatus can further include one or more among: (i) receiving a sideband optical signal with the optical detector, (ii) operating the input optical source to generate the input optical signal, (iii) arranging for the electromagnetic signal to be incident on additional ring optical resonators, or (iv) receiving multiple sideband optical signals with multiple optical detectors.

A second inventive apparatus includes a ring optical resonator and one or more input optical waveguide on a substrate. The ring optical resonator is arranged so as to support one or more resonant optical modes; each input optical waveguide is arranged so as to support one or more corresponding propagating input optical modes. Each input optical waveguide and the ring optical resonator are arranged and positioned so as to establish evanescent optical coupling therebetween. The ring optical resonator, the substrate, or both including one or more nonlinear optical materials. First and second input optical signals, at respective input optical frequencies $v_{IN1}$ and $v_{IN2}$, propagate along one or more of the one or more input optical waveguides in one or more propagating input optical modes and around the ring optical resonator in one or more resonant optical modes. The ring optical resonator, and one or more of the one or more input optical waveguides, are arranged so as to generate a millimeter-wave or sub-millimeter-wave electromagnetic signal at an electromagnetic frequency $v_{EM}$ that propagates away from the optical resonator, with $v_{EM}=|v_{IN1}-v_{IN2}|$.

In various examples the second inventive apparatus can further include one or more among (i) multiple input optical waveguides, (ii) sources of the first and second input optical signals, (iii) one or more frequency-locking mechanisms coupling one or both input optical signal sources and the ring optical resonator, (iv) one or more electrical traces acting as an antenna, or (v) a modulation system for modulating the output electromagnetic signal. In some examples an array of ring optical resonators can be employed to act (i) to form an image with output electromagnetic signals or (ii) as a phased array to from directional output electromagnetic signals.

An inventive method for using the second inventive apparatus includes launching the input optical signals to propagate along one or more of the one or more input optical waveguides. In various examples an inventive method for using the second inventive apparatus can further include one or more among: (i) operating input optical sources to generate the input optical signals, (ii) modulating the output electromagnetic signal to encode transmitted information, or (iii) generating multiple output electromagnetic signals with multiple optical resonators.

Objects and advantages pertaining to generation or detection of millimeter-wave or sub-millimeter-wave electromagnetic radiation may become apparent upon referring to the examples illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 6 through 8 are schematic diagrams of various examples of inventive apparatus for optical upconversion of millimeter-wave or sub-millimeter-wave electromagnetic radiation.

FIGS. 9 through 12 are schematic diagrams of various examples of inventive apparatus for generation of millimeter-wave or sub-millimeter-wave electromagnetic radiation.

Figure 1:
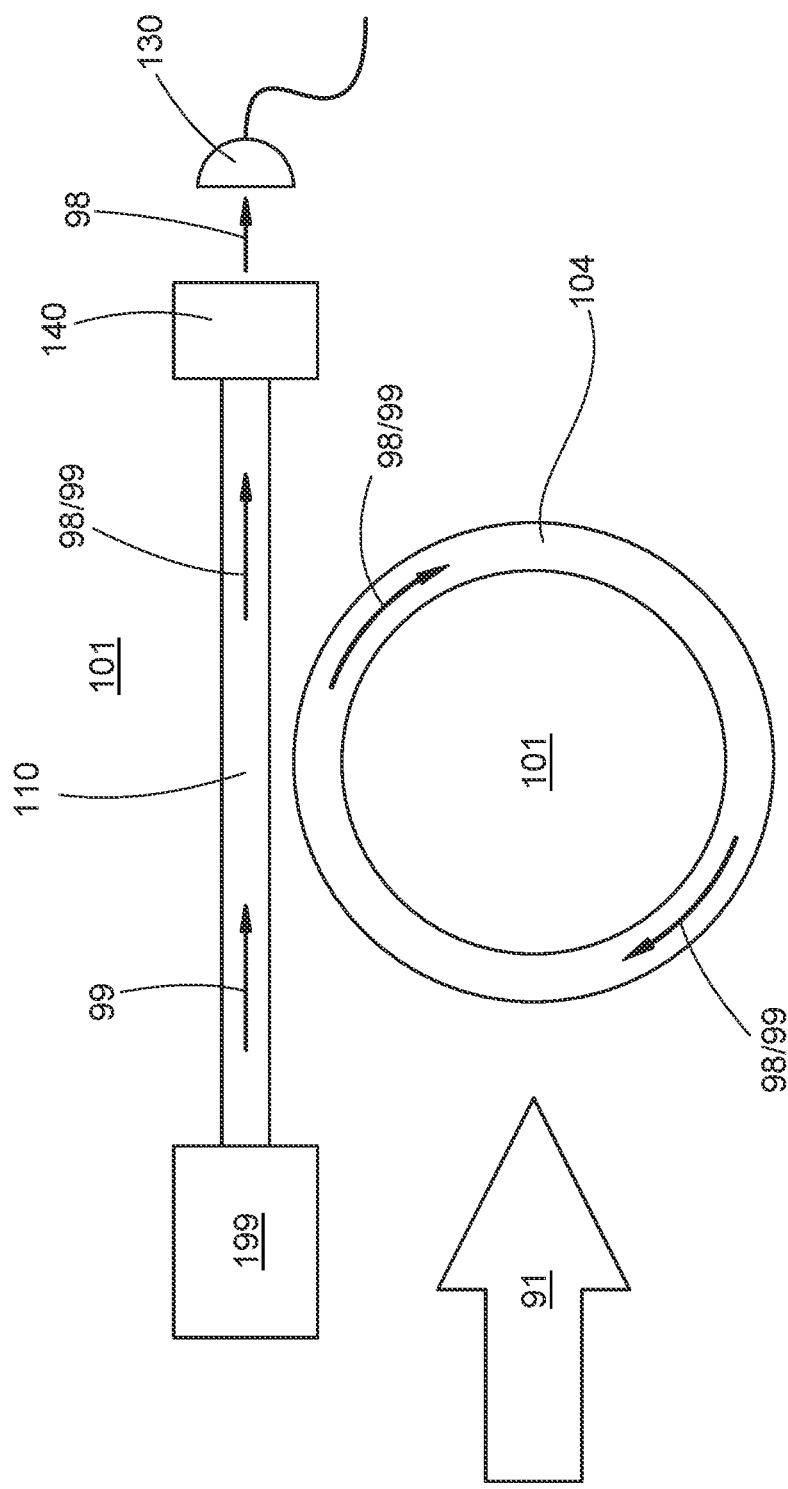
FIGS. 1 through 4 are schematic diagrams of various examples of inventive apparatus for optical upconversion of millimeter-wave or sub-millimeter-wave electromagnetic radiation.
Figure 2:
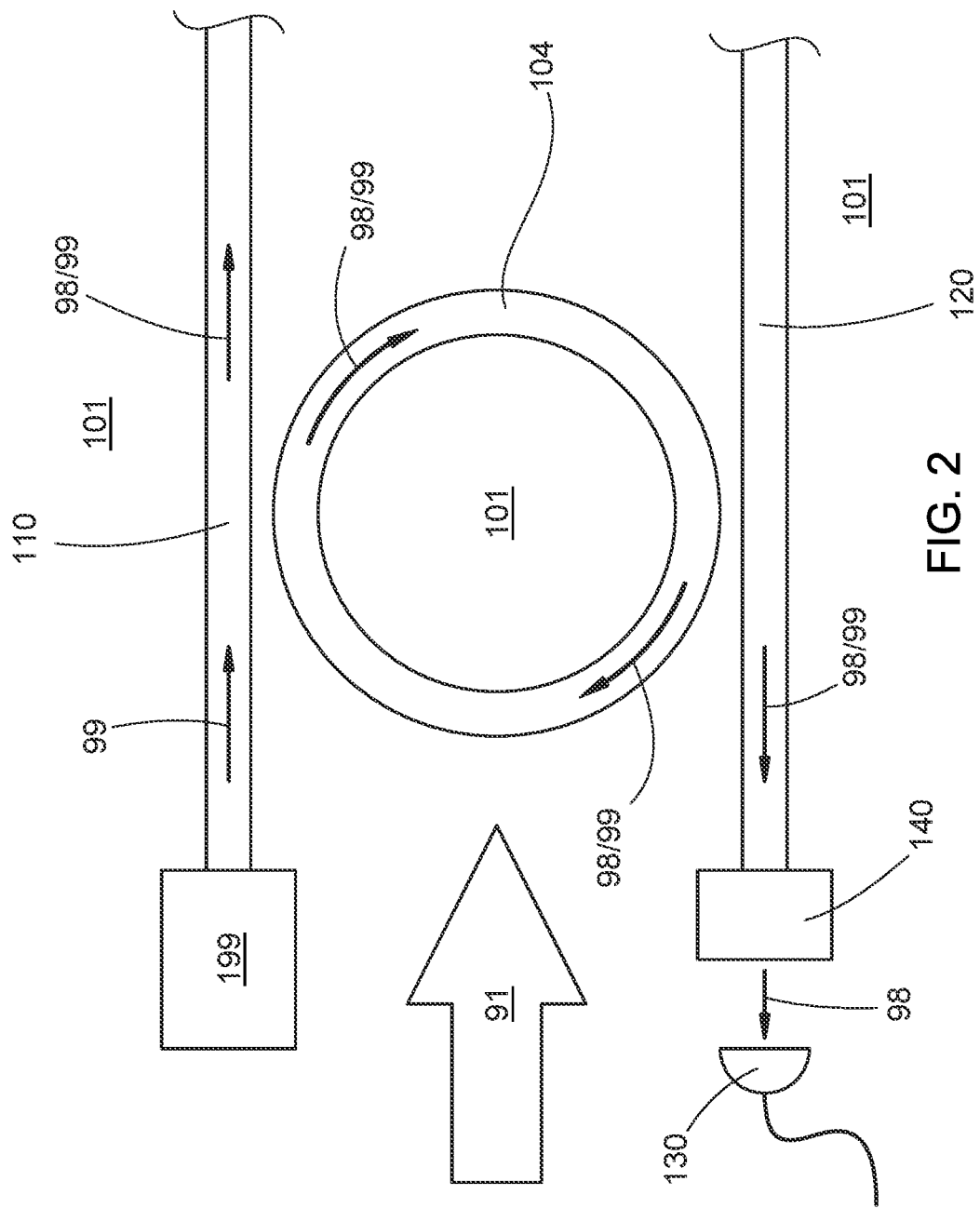

The examples depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. For example, widths of optical waveguides or separations between waveguides can be exaggerated relative to overall dimensions (e.g., diameter) of an optical resonator. The drawings show only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the inventive subject matter. The detailed description illustrates principles of the inventive subject matter by way of example, not by way of limitation.

FIGS. 1-4 and 6-8 illustrate schematically various examples of an inventive apparatus for optical upconversion of millimeter-wave or sub-millimeter-wave electromagnetic radiation. Each example of such an inventive apparatus includes a ring optical resonator 104 and an input optical waveguide 110 on a substrate 101. The ring optical resonator 104 is arranged so as to support one or more resonant optical modes; the input optical waveguide 110 is arranged so as to support one or more propagating input optical modes. The input optical waveguide 110 and the ring optical resonator 104 are arranged and positioned on the substrate 101 for evanescent optical coupling between them. An input optical signal 99 at an input optical frequency $v_{IN}$ propagates in one or more propagating input optical modes along the input optical waveguide 110. The input optical frequency $v_{IN}$ typically is in the visible or near-infrared regions of the electromagnetic spectrum (e.g., $v_{IN}$ in a range of about 100 THz to about 1000 THz, or corresponding vacuum wavelengths within a range of about 0.30 μm to about 3.0 μm). In some examples, the input optical frequency falls within a range corresponding to vacuum wavelengths between about 0.8 μm and about 1.7 μm.

Evanescent coupling between the resonator 104 and input waveguide 110, arranged in any suitable way, causes a portion of the input optical signal 99 to propagate around the resonator 104. When the input optical frequency $v_{IN}$ matches (i.e., is sufficiently close to) a resonant frequency $v_K$ of the resonator 104, the input optical signal power builds up in one or more corresponding resonant optical modes of the resonator 104. Depending on the Q-factor of the resonator 104 at the input optical frequency $v_{IN}$, optical power of the input optical signal 99 propagating around the resonator can be much larger than optical power of the input optical signal 99 propagating along the input waveguide 110. Power multiplication factors of 5, 10, 20, 50, 100, or more can be readily achieved. A portion of the input optical signal 99 propagates along the input waveguide 110 beyond the resonator 104; that portion is a superposition of a portion that propagates along the input waveguide 110 past the resonator 104, and a portion coupled out of the resonator 104 back into the input waveguide 110.

A millimeter- or sub-millimeter-wave electromagnetic signal 91 at an electromagnetic frequency $v_{EM}$ is incident on the ring optical resonator 104. In various examples the electromagnetic frequency $v_{EM}$ falls within the so-called millimeter-wave or extremely-high-frequency range (e.g., from about 0.030 THz to about 0.30 THz, or corresponding vacuum wavelengths from about 1.0 mm to about 10. mm) or within the so-called sub-millimeter-wave or terahertz range (e.g., from about 0.30 THz to about 30. THz, or corresponding vacuum wavelengths from about 0.010 mm to about 1.0 mm). For purposes of the present disclosure and appended claims, the terms "electromagnetic signal" and "electromagnetic frequency" refer to signals that fall within those frequency ranges, and shall distinguish those signals from so-called "optical signals" and "optical frequencies" characteristic of the input optical signal or other optical signals. In some examples, disclosed inventive apparatus and methods can be operative with the electromagnetic frequency $v_{EM}$ falling anywhere within the frequency range of millimeter-wave and sub-millimeter-wave electromagnetic radiation (i.e., from about 0.030 THz to about 30. THz). More commonly, a given example of inventive apparatus and methods can be arranged to be operative with the electromagnetic frequency $v_{EM}$ falling within any suitable, desirable, or necessary subrange of frequencies within the overall millimeter-wave or sub-millimeter-wave frequency ranges (e.g., about 0.030-0.10 THz, about 0.10-0.30 THz, about 0.30-1.0 THz, about 1.0-3.0 THz, about 3.0-10. THz, about 10-30. THz, or combinations thereof).

One or both of the ring optical resonator 104 and the substrate 101 include one or more nonlinear optical materials. With the millimeter- or sub-millimeter-wave electromagnetic signal 91 at the electromagnetic frequency $v_{EM}$ incident on the ring optical resonator 104, and with the input optical signal propagating around the resonator 104, one or more sideband optical signals 98 are generated by sum- or difference-frequency generation (SFG or DFG) between the input optical signal 99 and the electromagnetic signal 91. The generation of sideband optical signals 98 is mediated by the one or more nonlinear optical materials of the resonator 104 and/or substrate 101. The sideband optical signals 98 thus generated propagate around the ring optical resonator 104 at corresponding optical sideband frequencies $v_{SF} = v_{IN} + v_{EM}$ (SFG) or $v_{DF} = v_{IN} - v_{EM}$ (DFG). With the input optical frequency $v_{IN}$ is in the visible or near-infrared regions of the electromagnetic spectrum, the optical sideband frequencies $v_{SF}$ and $v_{DF}$ also fall within those spectral regions. The presence of a sideband optical signal 98 is indicative of the presence of the electromagnetic signal 91. For a given level of optical power of the input optical signal 99 propagating around the resonator 104, a detected power level of a sideband optical signal level 98 is indicative of the power level of the electromagnetic signal 91.

In some examples (e.g., as in FIG. 1), the evanescent optical coupling between the resonator 104 and the input waveguide 110 enables the generated sideband optical signals 98 to escape the resonator 104 and propagate along the input waveguide 110. An optical detector 130 of any suitable type or arrangement (e.g., photoconductive or photovoltaic p-i-n photodiode, avalanche photodiode, photomultiplier, and so forth) can be positioned and arranged in any suitable way to receive at least a portion of at least one sideband optical signal 98 and generate one or more corresponding electrical signals. Such electrical signals generated by the optical detector 130 can be further processed in any suitable way (e.g., demodulation) to extract from the detected sideband optical signals 98 information encoded by modulation of the electromagnetic signal 91. In some instances a high-speed optical detector 130 can be employed, i.e., a detector having bandwidth sufficient for enabling extraction of information encoded on the electromagnetic signal 91.

The one or more electrical signals can be generated in any suitable way. In some examples the one or more electrical signals are generated by the optical detector 130 by direct detection. In some examples a continuous-wave local-oscillator laser source can produce a local-oscillator optical signal characterized by a local-oscillator optical frequency either $v_{LO}=v_{SF}$ or $v_{LO}=v_{DF}$. In such examples the sideband and local-oscillator optical signals can be combined on one or more optical detectors 103 in an intradyne or homodyne arrangement to generate the one or more electrical signals. In some examples sideband and residual input optical signals can be combined on the optical detector 130 in a heterodyne arrangement to generate the one or more electrical signals. Various of those detection methods are disclosed in U.S. Pat. Pub. No. 2021/0311371 published 7 Oct. 2021 in the name of Kozlov (now U.S. Pat. No. 11,262,639), which is incorporated by reference as if set forth herein in its entirety.

In some examples, a signal processing system can be connected to the optical detector 130. The signal processing system can receive the one or more electrical signals, demodulate the one or more electrical signals, and decode transmitted information encoded by modulation of the electromagnetic signal 91. Any suitable modulation scheme can be employed to encode the transmitted information. In some examples the transmitted information can be encoded by the electromagnetic signal according to an analog modulation scheme; in some examples the transmitted information can be encoded by the electromagnetic signal according to a digital modulation scheme; in some examples the transmitted information can be encoded by the electromagnetic signal according to a QAM modulation scheme, a PSK modulation scheme, or a PAM modulation scheme. In various examples, the signal processing system can decode the transmitted information at a data rate greater than $5 \times 10^9$ bps, greater than $1.0 \times 10^{10}$ bps, greater than $2.0 \times 10^{10}$ bps, greater than $5 \times 10^{10}$ bps, greater than $1.0 \times 10^{11}$ bps, greater than $2.0 \times 10^{11}$ bps, or greater than $5 \times 10^{11}$ bps.

In some examples, the sideband optical signal 98 is received by the photodetector 130 after being at least partly separated or isolated from the input optical signal 99 in any suitable way. In some examples, one or more wavelength-selective or polarization-selective optical elements 140 (e.g., short pass, long pass, bandpass, or notch filters; polarizers; wavelength- or polarization-dependent waveguide structures) can be employed to separate or isolate a sideband optical signal 98 from the input optical signal 99. Such polarization- or wavelength-selective optical components 140 can (i) selectively direct or transmit portions of one or more of the sideband optical signals 98 to propagate to the optical detector 130 and (ii) selectively reduce direction or transmission of the input optical signal 99 propagating to the optical detector 130. Examples of such separation or isolation are disclosed in, e.g., U.S. Pat. No. 9,377,362 issued Jun. 28, 2016 to Kozlov et al, U.S. Pat. No. 9,574,944 issued Feb. 21, 2017 to Kozlov et al, and U.S. Pat. Pub. No. 2021/0311371 published 7 Oct. 2021 in the name of Kozlov (now U.S. Pat. No. 11,262,639), each of which is incorporated by reference as if set forth herein in its entirety.

In some examples (e.g., as in FIG. 2), an output optical waveguide 120 on the substrate 101 is evanescently optical coupled to the ring optical resonator 104. The output optical waveguide 120 supports one or more propagating output optical modes. The evanescent optical coupling between the resonator 104 and the output waveguide 120 enables at least a portion of the generated sideband optical signals 98 to escape the resonator 104 and propagate along the output waveguide 120. As described above, at least one of the sideband optical signals 98 can be received by a photodetector 130, and one or more wavelength- or polarization-selective optical components 140 can be employed to separate or isolate the received sideband optical signal 98 from the input optical signal 99.

Figure 5A:
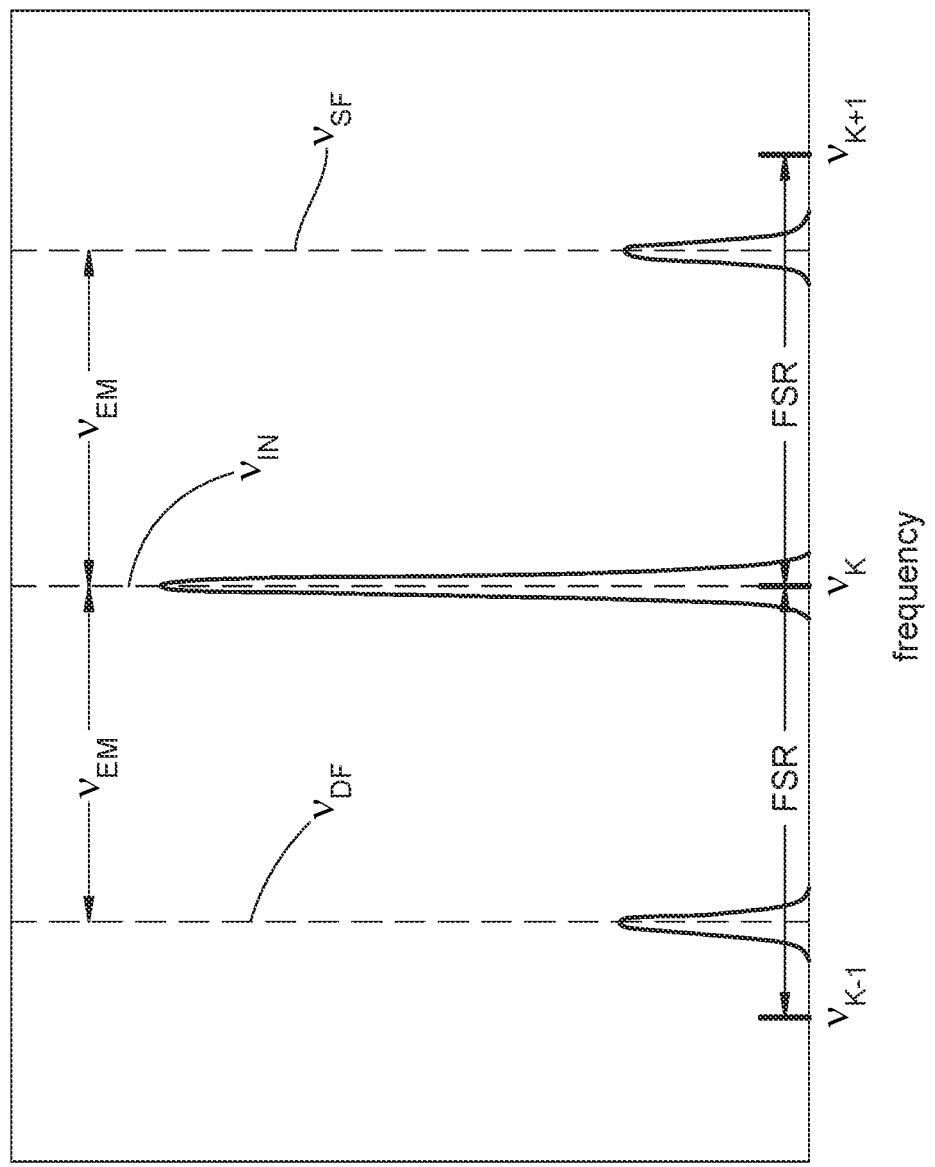
FIGS. 5A through 5D are example spectra of sideband optical frequencies and resonator optical frequencies for several examples of inventive apparatus.
Figure 5B:
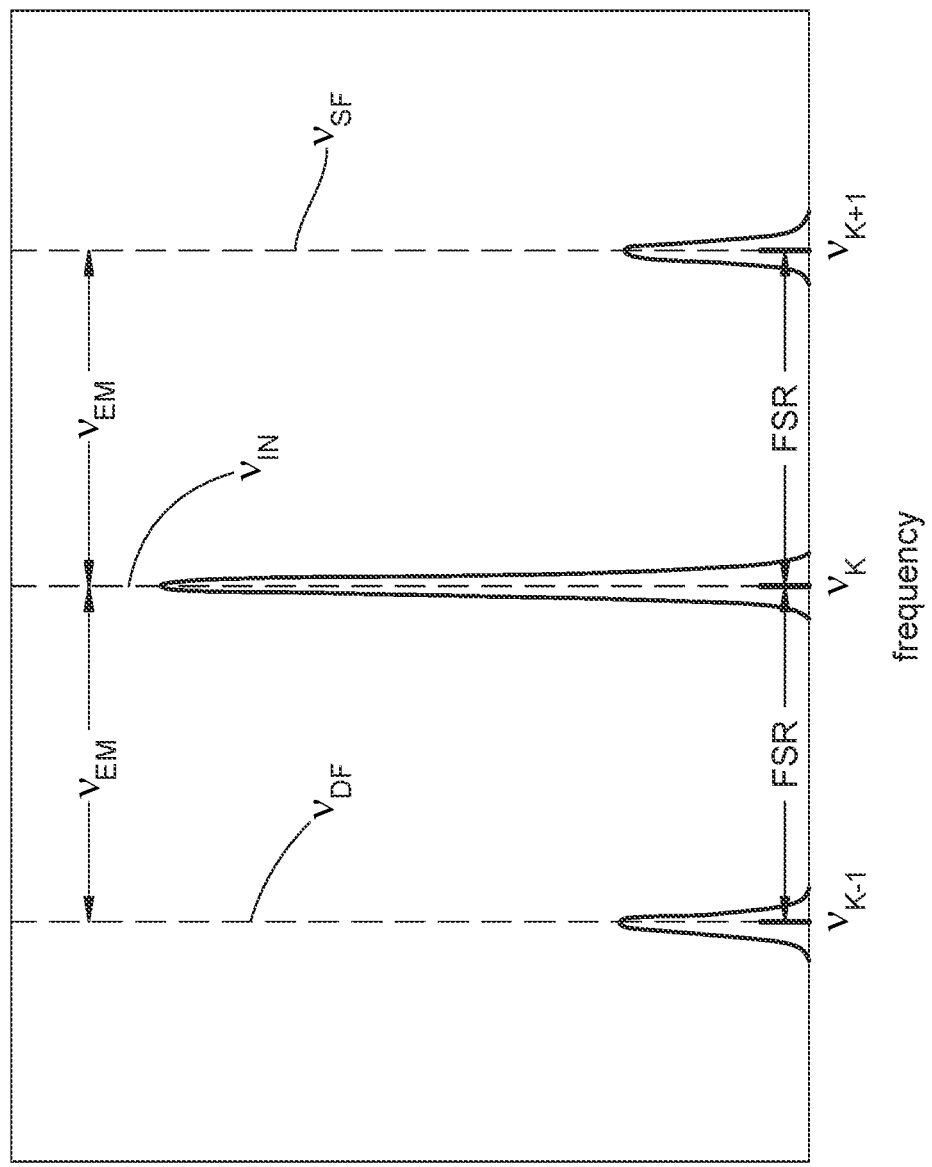
Figure 5C:
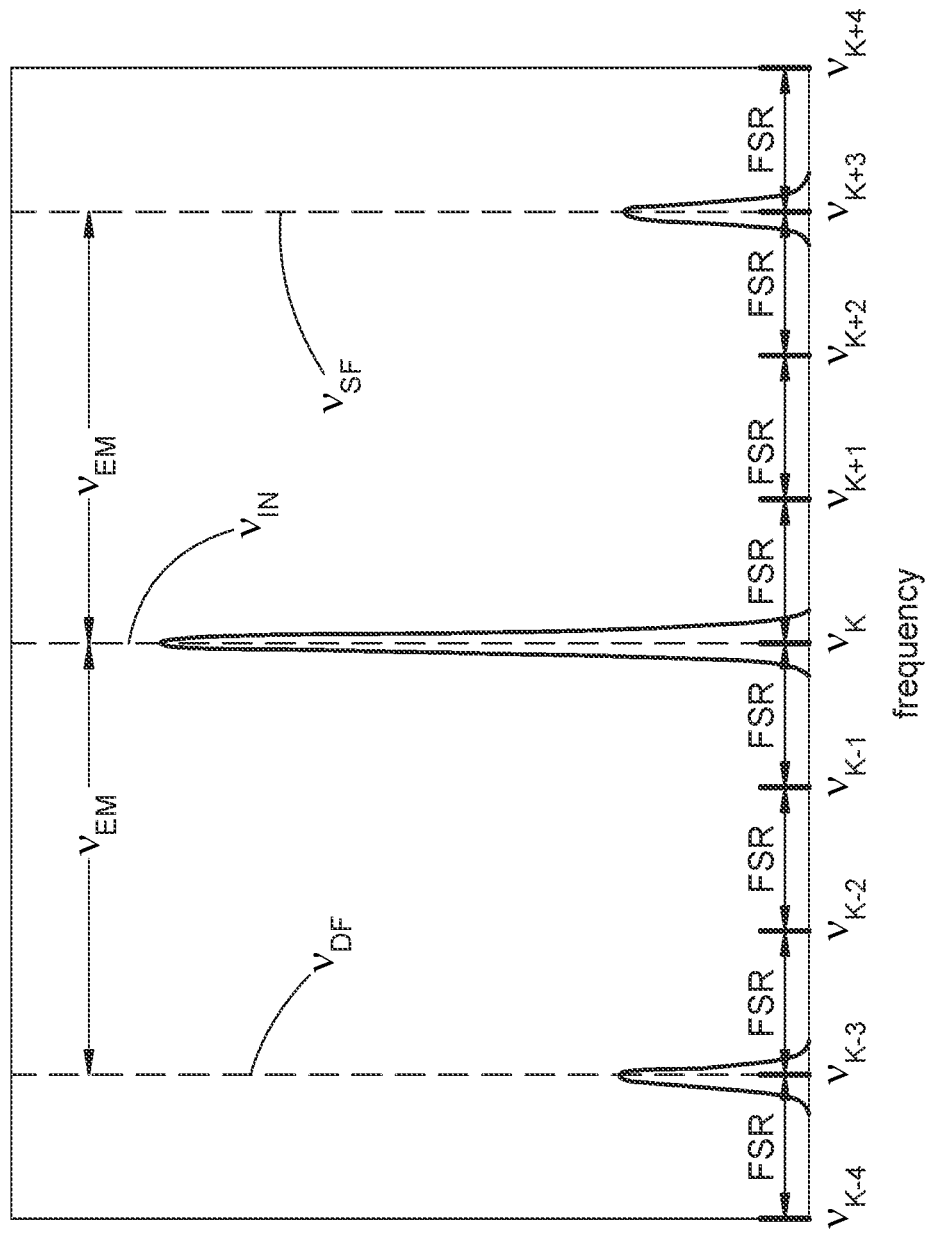

The inventive apparatus is operated so that one or more of the resonant optical modes of the ring optical resonator has a corresponding resonant optical frequency $v_K$ about equal to $v_{IN}$ (e.g., as in FIGS. 5A-5C). Under those operating conditions, the resonance enhancement of the optical power level of the input optical signal 99 propagating around the resonator 104 also enhances the efficiency of the sum- and difference frequency generation process that generates the sideband optical signals 98. For a given power level of the input optical signal propagating along the input waveguide 110, and a given incident electromagnetic signal power, resonance enhancement of the power level of the input optical signal 99 by a factor of X increases the efficiency of sideband signal generation by a factor of X, enabling detection or measurement of weaker electromagnetic signals by upconversion using a given input signal power level propagating along the input waveguide 110, or enabling upconversion of the electromagnetic signal 91 using a lower input signal power level propagating along the input waveguide 110.

Active stabilization or feedback control often can be required to maintain a near match between the input optical frequency $v_{IN}$ and a resonant mode frequency $v_K$ of the ring optical resonator 104 (to achieve the desired resonant power enhancement). In some examples the inventive apparatus can further include an input optical source 199 (e.g., typically a laser) that generates the input optical signal 99 and launches it to propagate along the input optical waveguide 110. In some examples the input optical source 199 can be a continuous-wave laser source that is frequency-locked to a corresponding resonant optical mode of the ring optical resonator, i.e., so that the input optical frequency $v_{IN}$ is locked to a resonant mode frequency $v_K$ of the ring optical resonator 104.

Figure 3:
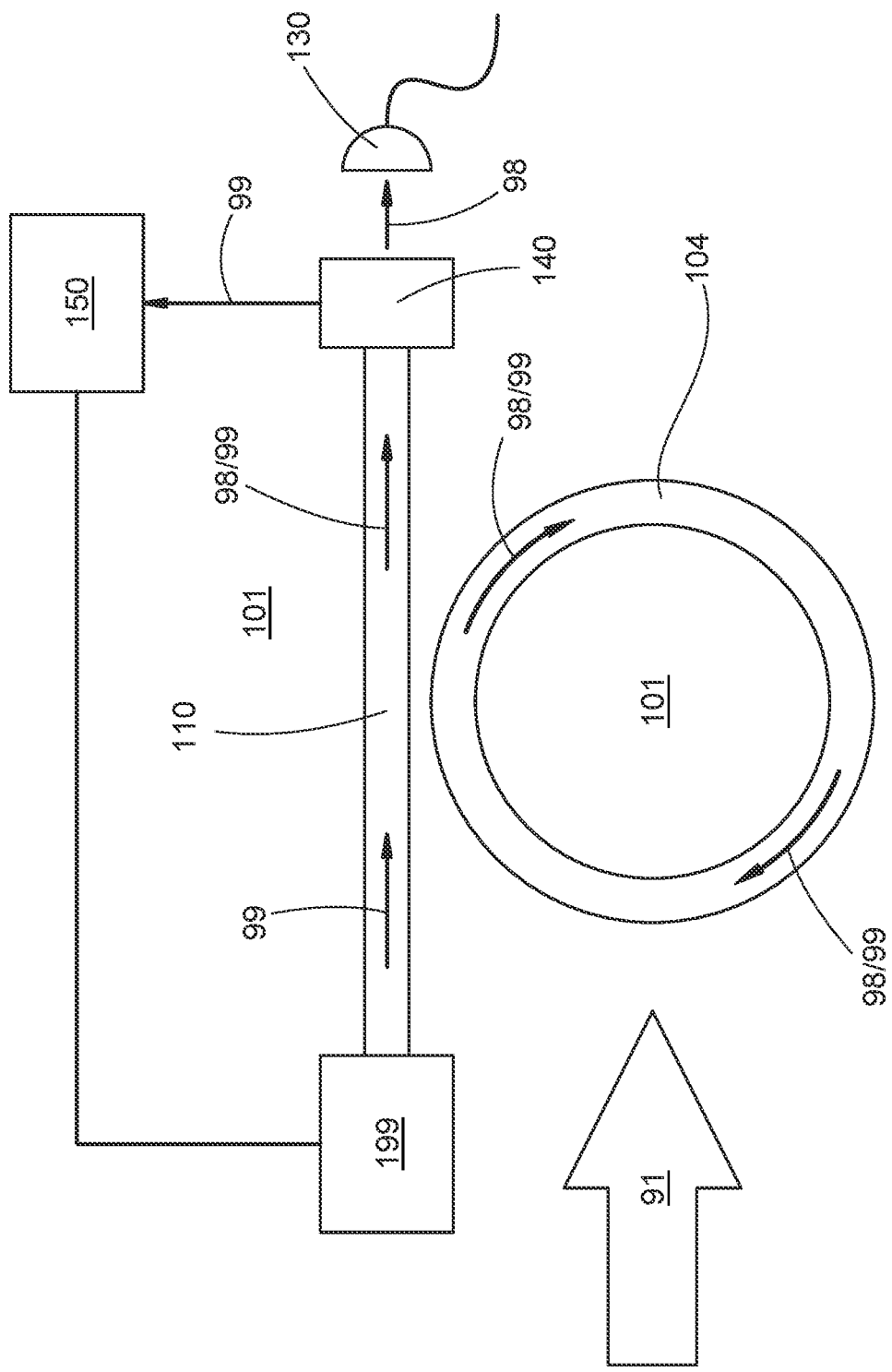
Figure 4:
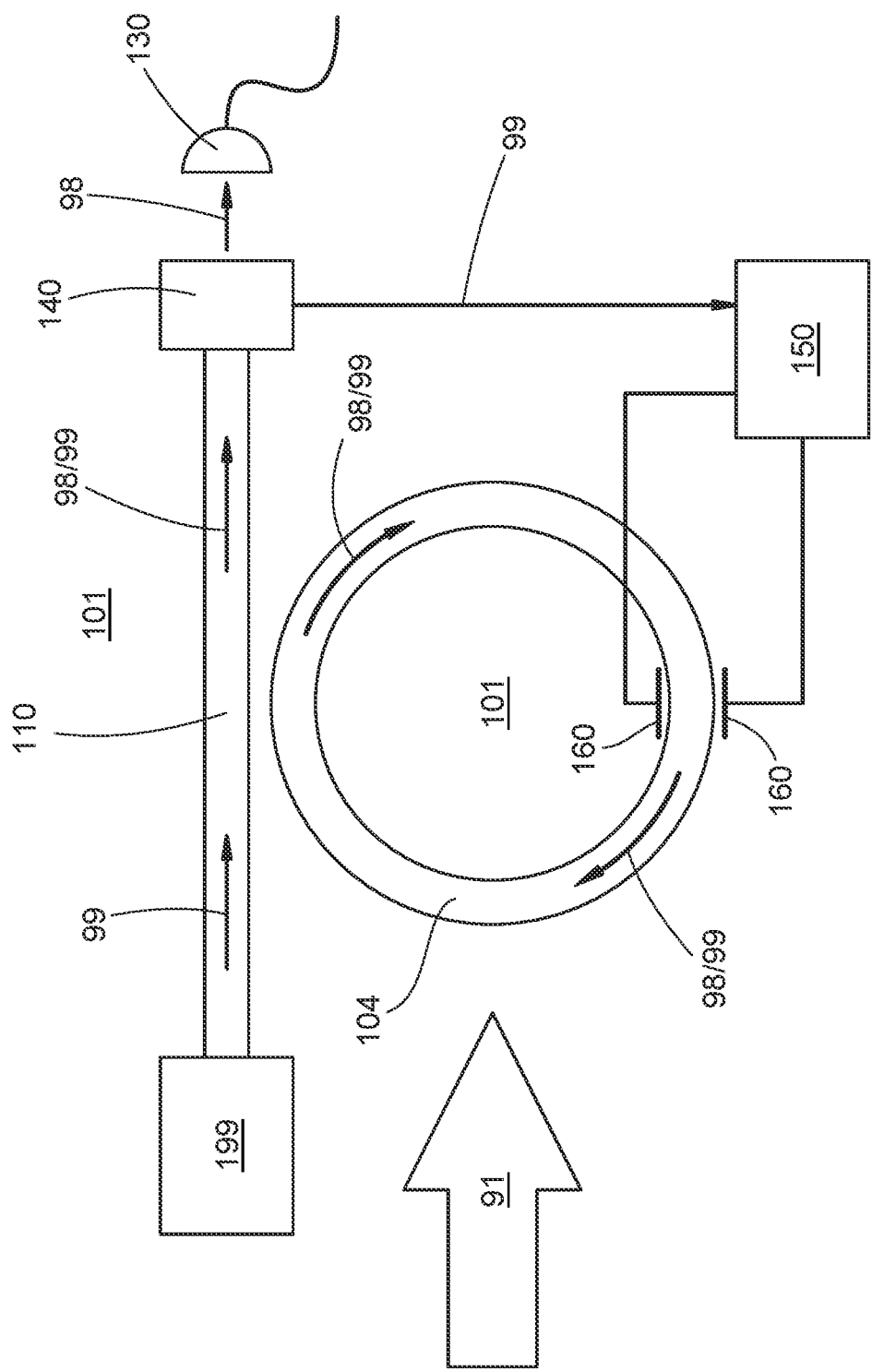

Any suitable frequency-locking mechanism 150 can be employed, e.g., a Pound-Drever-Hall mechanism or a Hänsch-Couillaud mechanism. See, e.g., (i) Hänsch et al, Optics Communications, Vol. 35 No. 3 p. 441 (1980), (ii) Dreyer et al, Applied Physics B, Vol. 31 p. 97 (1983), and (iii) Black, American Journal of Physics, Vol. 69 No. 1 p. 79 (2001), each of which is incorporated by reference in its entirety. In some examples (e.g., as in FIG. 3), the frequency-locking mechanism 150 produces a control signal, and application of the control signal to the optical source 199 alters the input optical frequency $v_{IN}$ (in any suitable way) to track changes or fluctuations of the resonant mode frequency $v_K$ of the resonator 104. In some examples (e.g., as in FIG. 4) the frequency-locking mechanism 150 produces a control signal, and application of the control signal to the ring optical resonator 104 tunes the resonant mode frequency $\nu_K$ of the resonator 104 (in any suitable way; typically via an electrooptic effect exhibited by the nonlinear optical material of the resonator 104 or the substrate 101) to track changes or fluctuations of the input optical frequency $\nu_{IN}$. In some such examples (e.g., as in FIG. 4), one or more electrodes 160 on the substrate 101 are positioned and arranged relative to the ring optical resonator 104 so that resonant optical frequencies $\nu_{K-1}$, $\nu_K$, $\nu_{K+1}$, etc of the resonant optical modes vary according to corresponding voltages applied to the electrode(s) 160 by the frequency-locking mechanism 150. The control mechanism 150 (and electrodes 160, if present) are shown in FIG. 3 or 4 incorporated into an inventive apparatus arranged as in FIG. 1. The control mechanism 150 (and electrodes 160, if present) can also be incorporated into an inventive apparatus that includes an output waveguide 120 (as in FIG. 2).

In some examples (e.g., as in FIGS. 5B and 5C), efficiency of generation of a sideband optical signal 98 can be further enhanced if the corresponding sideband optical frequencies ($\nu_{SF}$ and $\nu_{DF}$) match the corresponding resonant optical frequencies $\nu_{K-1}$ or $\nu_{K+1}$ (FIG. 5B) or $\nu_{K-N}$ or $\nu_{K+N}$ (FIG. 5C) of the ring optical resonator 104. That condition can be achieved when the input optical frequency $\nu_{IN}$ corresponds to a resonant optical frequency $\nu_K$ of the ring optical resonator 104, and the ring optical resonator 104 exhibits a free spectral range (FSR) about equal to $\nu_{EM}$ (FIG. 5B) or $\nu_{EM}/N$ (FIG. 5C), where N is an integer. In such examples, a first frequency-locking mechanism 150 can be connected to the optical source 199 to lock the input frequency $\nu_{IN}$ to a resonant mode frequency $\nu_K$ of the ring optical resonator 104, while a second frequency-locking mechanism (not shown) can be connected to the electrode(s) 160 to lock the FSR of the resonator 104 to $\nu_{EM}$ or $\nu_{EM}/N$. Such an arrangement can be incorporated into any of the examples described above.

In some examples (e.g., as in FIG. 6), an auxiliary ring optical resonator 106 on the substrate 101 is evanescently optically coupled to the ring optical resonator 104 and to the output optical waveguide 120. The auxiliary resonator 106 supports one or more auxiliary resonant optical modes, and provides evanescent optical coupling between the ring optical resonator 104 and the output optical waveguide 120. In some of those examples, an auxiliary resonant optical mode can have a corresponding resonant optical frequency about equal to $\nu_{SF}$ or $\nu_{DF}$, so that the auxiliary resonator 106 acts as a wavelength-selective filter for separating or isolating one of the sideband optical signals 98 from the input optical signal 99. An auxiliary resonator 106 can be incorporated into any of the examples described above.

In some examples (e.g., as in FIG. 7), one or more electrically conductive traces on the substrate 101 can be arranged as an antenna 170 for the electromagnetic signal 91. Any suitable conductive material can be employed; gold, silver, copper, and aluminum are common examples. The antenna 170 can be positioned relative to the ring optical resonator 104 to enhance generation of the sideband optical signals 98, by increasing the effective intensity of the electromagnetic signal 91 in the vicinity of the resonator 104. In a specific example, the antenna 170 includes two portions of opposite side of the resonator 104; each portion can be about 30-300 μm long and separated from the resonator by a gap of about 3-30 μm, e.g., about 10 μm. An antenna 170 can be incorporated into any of the examples described above.

In some examples (e.g., as in FIG. 8), a one- or two-dimensional array of multiple resonators 104 and corresponding input waveguides 110 (and corresponding output waveguides 120 or antennas 170 in some examples) can be arranged on the substrate 101 as described above. Each resonator 104 can generate corresponding sideband signals 98 when input signals 99 propagate along the corresponding input waveguides 110 and an electromagnetic signal 91 is incident on the corresponding resonator 104. In some such examples, the multiple resonators 104 and corresponding optical detectors 130 act together as an imaging array for the incident electromagnetic signal 91. Any of the examples described above can be replicated in this way, and in some instances act together as an imaging array for the electromagnetic signal 91.

In any of the preceding examples, the ring optical resonator 104 can be arranged in any of many suitable ways for supporting the resonant optical modes, for evanescent optical coupling with the input waveguide 110 (and output waveguide 120 or auxiliary resonator 106, if present) and for facilitating nonlinear optical sum- and difference-frequency processes. In some examples the ring optical resonator 104 can comprise a higher-index core surrounded by a lower-index cladding. In such examples, suitable nonlinear optical material can be incorporated into the core, cladding, or surrounding or adjacent portions of the substrate 101. In some examples the ring optical resonator 104 can comprise a ridge optical waveguide formed on the surface of the substrate 101. In such examples wherein the substrate includes nonlinear optical material, that material typically would be located at or on a surface of the substrate 101, so that evanescent portions of the resonant optical modes spatially overlap the nonlinear optical material. In some such examples nonlinear optical material is included in the ridge waveguide.

Various examples of ring optical resonators incorporating or coupled to nonlinear optical materials are disclosed in, e.g., (i) Zhang et al, Optica, Vol. 4 No. 12 p. 1536 (2017); (ii) Yao et al, IEEE Journal of Selected Topics in Quantum Electronics, Vol. 24 No. 6 p. 5900324 (2018); (iii) Ahmed et al, Advanced Photonic Congress, Paper No. IM3A.5 (2019); (iv) Ahmed et al, Optics letters, Vol. 44 No. 3 P 618 (2019); and (v) Shao et al, Optica, Vol. 6, No. 12 p. 1498 (2019), each of which is incorporated by reference in its entirety.

Any suitable one or more nonlinear optical materials can be incorporated into the ring optical resonator 104 or the substrate 101, or both, for upconverting the millimeter-wave or sub-millimeter-wave electromagnetic signal 91 by sum- or difference-frequency generation with the input optical signal 99. Suitable nonlinear optical materials can include, but are not limited to, one or more of gallium arsenide or gallium phosphide or other III-V semiconductors or alloys thereof; one or more II-VI semiconductors or alloys thereof; one or more of DAST (4-N,N-dimethylamino-4'-N'-methyl-stilbazolium tosylate), OH1 (2-(3-(4-hydroxystyryl)-5,5-dimethylcyclohex-2-enylidene) malononitrile), or DSTMS (4-N,N-dimethylamino-4'-N'-methyl-stilbazolium 2,4,6-trimethylbenzenesulfonate), or other organic material exhibiting suitable nonlinear optical properties; one or more polymers exhibiting suitable nonlinear optical properties; potassium or lithium niobate or other inorganic material exhibiting suitable nonlinear optical properties; or other suitable nonlinear optical materials.

The nonlinear optical material can be arranged in any suitable way for any necessary or desirable sum- or difference-frequency mixing scheme. In some instances a suitable phase-matching (critical or non-critical) or quasi-phasematching scheme can be employed for any suitable nonlinear optical process, e.g., Type 0, I, II, and so forth. In some such examples the nonlinear optical material can be structured or arranged in any suitable way (e.g., birefringent, orientation-patterned, periodically poled, birefringent plates of alternating orientations, and so forth). In some examples, the coherence length of the nonlinear generation process is comparable to or longer than the ring optical resonator; in such instances a phase-matching scheme, and corresponding structure or arrangement of the nonlinear optical material, may not be necessary or useful. In some examples it can be advantageous to employ a nonlinear optical generation scheme that produces sideband signals 98 that are polarized orthogonally relative to polarization of the input signal 99. Such orthogonal polarization enables subsequent separation or isolation of the sideband signal(s) 98 using one or more polarization-selective optical components 140, as described above.

For convenience only, in the drawings the propagation direction of the electromagnetic signal 91 is shown lying in the plane of the substrate 101 (i.e., in the plane of the drawing) and parallel to the input optical waveguide 110 (or at least that portion of the input waveguide 110 that is evanescently coupled to the resonator 104). However, this need not be the case. In some examples, the ring optical resonator 104, the input optical waveguide 110, and the substrate 101 can be arranged to generate sideband optical signals 98 with at least a component of a propagation direction of the electromagnetic signal 91 parallel to the surface of the substrate 101, and at any suitable angle relative to the input waveguide 110; in some of those examples, propagation of the electromagnetic signal 91 can be substantially parallel to the substrate 101. In some examples, the resonator 104, the input waveguide 110, and the substrate 101 can be arranged to generate sideband signals 98 with at least a component of a propagation direction of the electromagnetic signal 91 perpendicular to the surface of the substrate 101; in some of those examples, propagation of the electromagnetic signal 91 can be substantially perpendicular to the substrate 101.

Similarly, in some examples at least a component of the propagation direction of the electromagnetic signal 91 can be parallel to that portion of the input waveguide 110 that is evanescently coupled to the ring resonator 104; in some of those examples, propagation of the electromagnetic signal 91 can be substantially parallel to that portion of the input waveguide 110. In some examples at least a component of the propagation direction of the electromagnetic signal 91 can be perpendicular to that portion of the input waveguide 110 that is evanescently coupled to the ring resonator 104; in some of those examples, propagation of the electromagnetic signal 91 can be substantially perpendicular to that portion of the input waveguide 110.

In ring optical resonator 104, and the auxiliary ring optical resonator 106, are shown in the drawings as being circular, but this need not be the case. Any necessary, desirable, or suitable shape can be employed, e.g., elliptical, oval or racetrack, clothoid or Euler spiral, other shapes, or composites thereof. In some instances, for example, it can be advantageous to align an elongated, straight section of the ring resonator with an in-plane component of the propagation direction of the electromagnetic signal 91, to increase the effective interaction length for upconversion of the electromagnetic signal 91 to generate sideband signals 98.

Figure 5D:
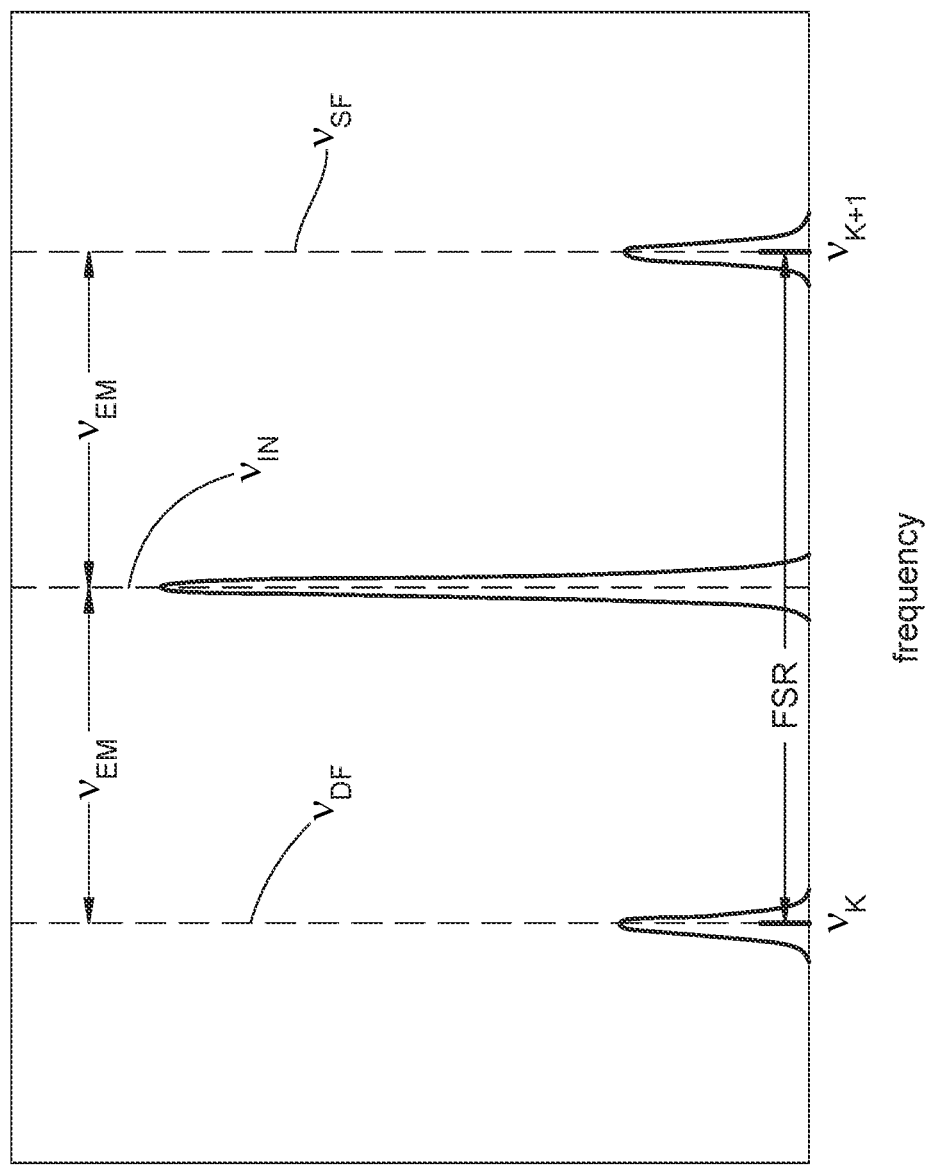
Figure 7:
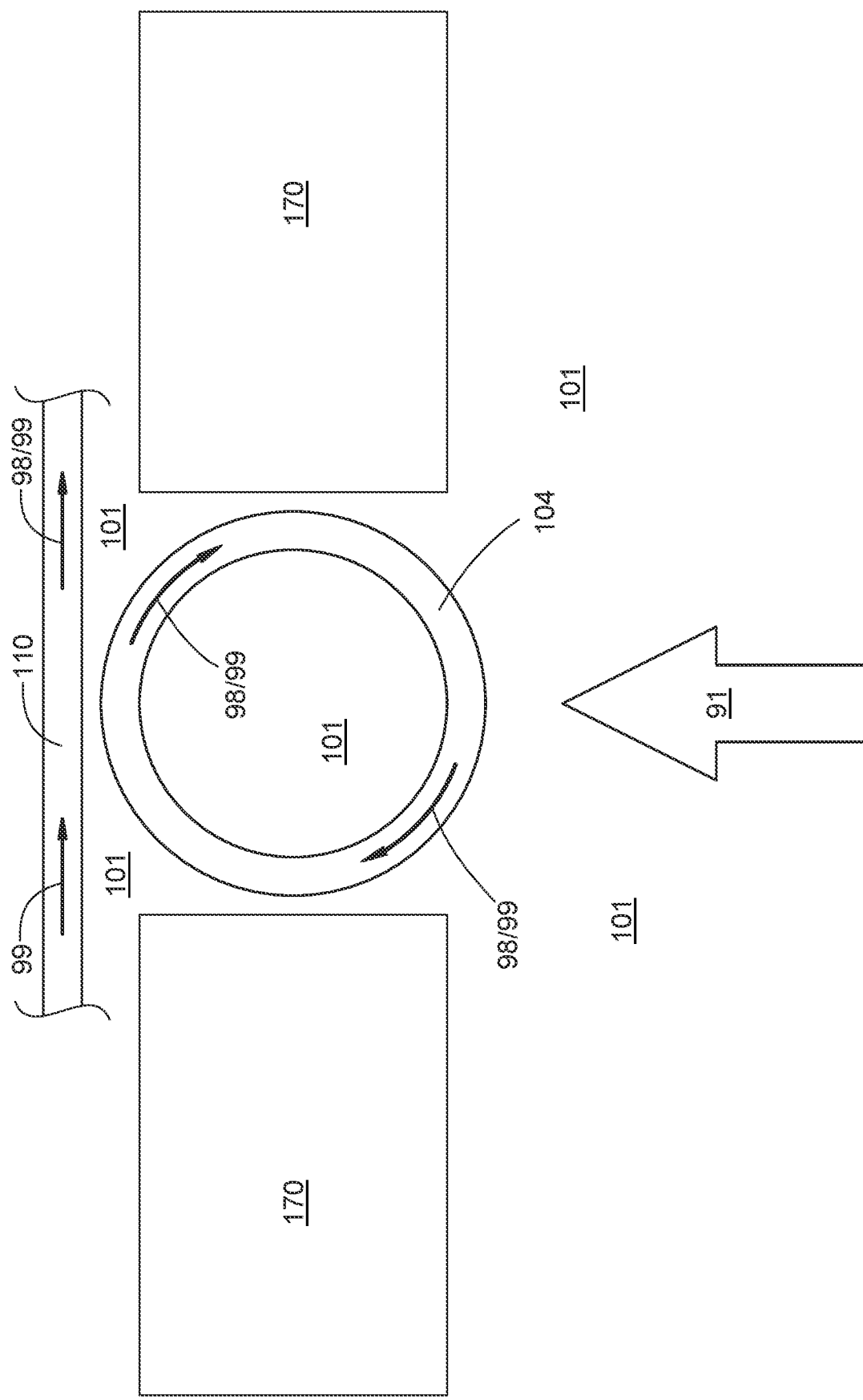
Figure 8:
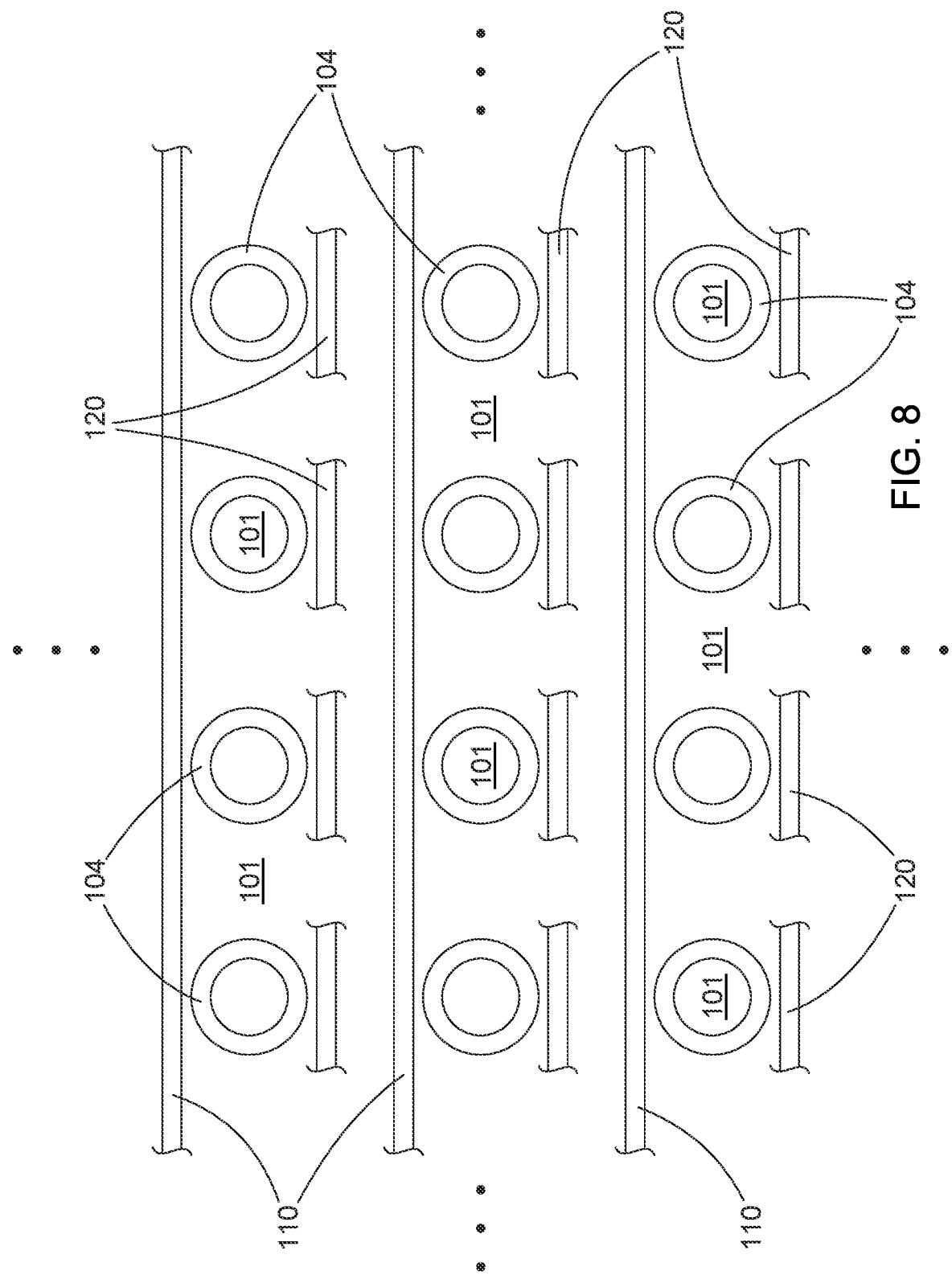

The ring optical resonator 104 can be of any suitable size and exhibit a set of resonant frequencies . . . $\nu_{K-1}$, $\nu_K$, $\nu_{K+1}$, . . . separated by a free spectral range (FSR). In some examples, the ring optical resonator 104 can be a so-called micro-ring resonator, e.g., a circular ring resonator having a radius less than a millimeter and a corresponding free spectral range greater than about, e.g., 0.02 THz (for an input wavelength around 1500 nm and using typical materials for the resonator). In some examples (e.g., as in FIG. 5A), only the input optical frequency $\nu_{IN}$ corresponds to a resonant optical frequency $\nu_K$ of the ring optical resonator 104, resulting in a resonance-enhanced power level for the input signal 99 propagating around the resonator 104. In other examples, the resonator 104 can be constructed to exhibit a free spectral range about equal to $\nu_{EM}$ (FIG. 5B) or $\nu_{EM}/N$ (FIG. 5C), so that, in additional to the input signal 99 at frequency $\nu_{IN}$ matching a resonator frequency $\nu_K$, the sideband signals 98 at corresponding frequencies $\nu_{SF}$ or $\nu_{DF}$ can also match corresponding resonator frequencies $\nu_{K-1}$ and $\nu_{K+1}$ (FIG. 5B) or $\nu_{K-N}$ and $\nu_{K+N}$ (FIG. 5C) of the resonator 104. Such an arrangement can result in further enhancement of upconversion of the electromagnetic signal 91. In some examples, it may be desirable for only one of the sideband signals 98 to be resonant with the resonator 104. In another example (e.g., as in FIG. 5D), the sideband frequencies $\nu_{SF}$ and $\nu_{DF}$ can match resonator frequencies $\nu_K$ and $\nu_{K+1}$ while the input frequency $\nu_{IN}$ does not match any resonator mode frequency.

In one example, a lithium niobate ring resonator 104 has a radius of 57.6 µm an exhibits a free spectral range of about 375 THz (about 3 nm at an input wavelength of 1550 nm). For an electromagnetic signal 91 with $\nu_{EM}$ of about 0.3 THz, the free spectral range is greater than the spacing between the input signal frequency (wavelength 1550 nm) and the sideband frequencies (wavelengths 1547.6 nm and 1552.4 nm). Thus in this example only the input signal 99 would be resonant with a mode of the resonator 104 (e.g., as in FIG. 5A). In another example, the radius of the lithium niobate resonator 104 is 72 µm and the free spectral range is about 0.30 THz (about 2.4 nm at an input wavelength of 1550 nm). If the electromagnetic frequency $\nu_{EM}$ is about 0.3 THz, then both input and sideband frequencies can be resonant with corresponding modes of the optical resonator 104 (e.g., as in FIG. 5B). In another example, the radius of the lithium niobate resonator is 216 µm and the corresponding free spectral range is about 0.10 THz (about 0.8 nm at an input wavelength of 1550 nm). If the electromagnetic frequency $\nu_{EM}$ is about 0.1 THz, then in this example both input and sideband frequencies (input wavelength 1550 nm and sideband wavelengths 1549.2 nm and 1550.8 nm) can be resonant with corresponding modes of the resonator 104 (e.g., as in FIG. 5B). In another instance with the same resonator properties, if the electromagnetic frequency $\nu_{EM}$ is about 0.3 THz, then both input and sideband frequencies can be resonant with corresponding modes of the resonator 104, with the free spectral range being equal to $\nu_{EM}/3$ (e.g., as in FIG. 5C).

In another example, the radius of the lithium niobate resonator is 36 µm and the corresponding free spectral range is about 0.6 THz (4.8 nm at an input wavelength of 1550 nm). If the electromagnetic frequency $\nu_{EM}$ is about 0.3 THz, then both sideband signals 98 (at wavelengths 1547.6 nm and 1552.4 nm) can be resonant with the resonator 104 while the input signal 99 (at wavelength 1550 nm) is not (e.g., as in FIG. 5D). In another example, the radius of the lithium niobate resonator is 108 µm and the corresponding free spectral range is about 0.2 THz (1.6 nm at an input wavelength of 1550 nm). If the electromagnetic frequency $\nu_{EM}$ is about 0.1 THz, both sideband signals 98 (at wavelengths 1549.2 nm and 1550.8 nm) can be resonant with the resonator 104 while the input signal 99 (at wavelength 1550 nm) is not (e.g., as in FIG. 5D).

Other suitable dimensions and corresponding free spectral ranges can be employed for various combinations of $v_{IN}$, $v_{EM}$, $v_{SF}$, and $v_{DF}$, depending on which combination of one or more among the input signal 99 and the sideband signals 98 are needed or desired to be resonant with the resonator 104.

In an inventive method, the substrate 101 is positioned, or the electromagnetic signal 91 is directed, so that the electromagnetic signal 91 is incident on at least a portion of the ring optical resonator 104. If the resonator 104 is a microring, typically the entire resonator 104 would be illuminated by the electromagnetic signal 91. The input signal 99 is launched to propagate along the input optical waveguide 110 and around the resonator 104. One or more sideband optical signals 98 are generated by nonlinear optical processes mediated by one or more nonlinear optical materials incorporated into the resonator 104 or the substrate 101. The sideband signals 98 propagate around the resonator 104.

In some examples an inventive method can further include receiving at least a portions of the sideband optical signals 98 with the optical detector 130 to generate a corresponding electrical signal indicative of presence or intensity of the electromagnetic signal 91. In some examples an inventive method can further include operating the input optical source 199 to generate the input optical signal 99; in some examples the optical source can be a laser source or can be frequency-locked to a resonant frequency of the resonator 104. In some examples an inventive method can include employing a one- or two-dimensional array of multiple resonators 104 and corresponding input waveguides 110 (and other elements, if present). Such an array can be employed to form an image of the electromagnetic signal 91.

The foregoing examples include ring optical resonators and are arranged for optical upconversion of an electromagnetic signal 91 (characterized by a frequency $v_{EM}$ in the millimeter-wave or sub-millimeter-wave region of the electromagnetic spectrum) using an input optical signal 99 (characterized by a frequency $v_{IN}$ in the optical region of the electromagnetic spectrum). The resulting upconverted sideband optical signal(s) 98 is/are generated by one or both of sum-frequency generation (SFG) or difference-frequency generation (DFG) between the input optical signal 99 and the incident s incident electromagnetic signal 91, and is characterized by one or both frequencies $v_{SF}=v_{IN}+v_{EM}$ (SFG) or $v_{DF}=v_{IN}-v_{EM}$ (DFG). As described above, such examples can be employed, e.g., to enable detection or demodulation of the electromagnetic signal 91.

Instead, in some examples two optical signals 99a and 99b at respective optical frequencies $v_{IN1}$ and $v_{IN2}$ can be directed to propagate around the resonator 104 and generate (by difference-frequency generation, i.e., DFG) an output electromagnetic signal 92 at frequency $v_{EM}=|v_{IN1}-v_{IN2}|$. Typically two input optical sources 199a and 199b (typically lasers) produce the input optical signals 99a and 99b, respectively; other suitable arrangements can be employed for generating the input optical signals 99a/99b.

Figure 9:
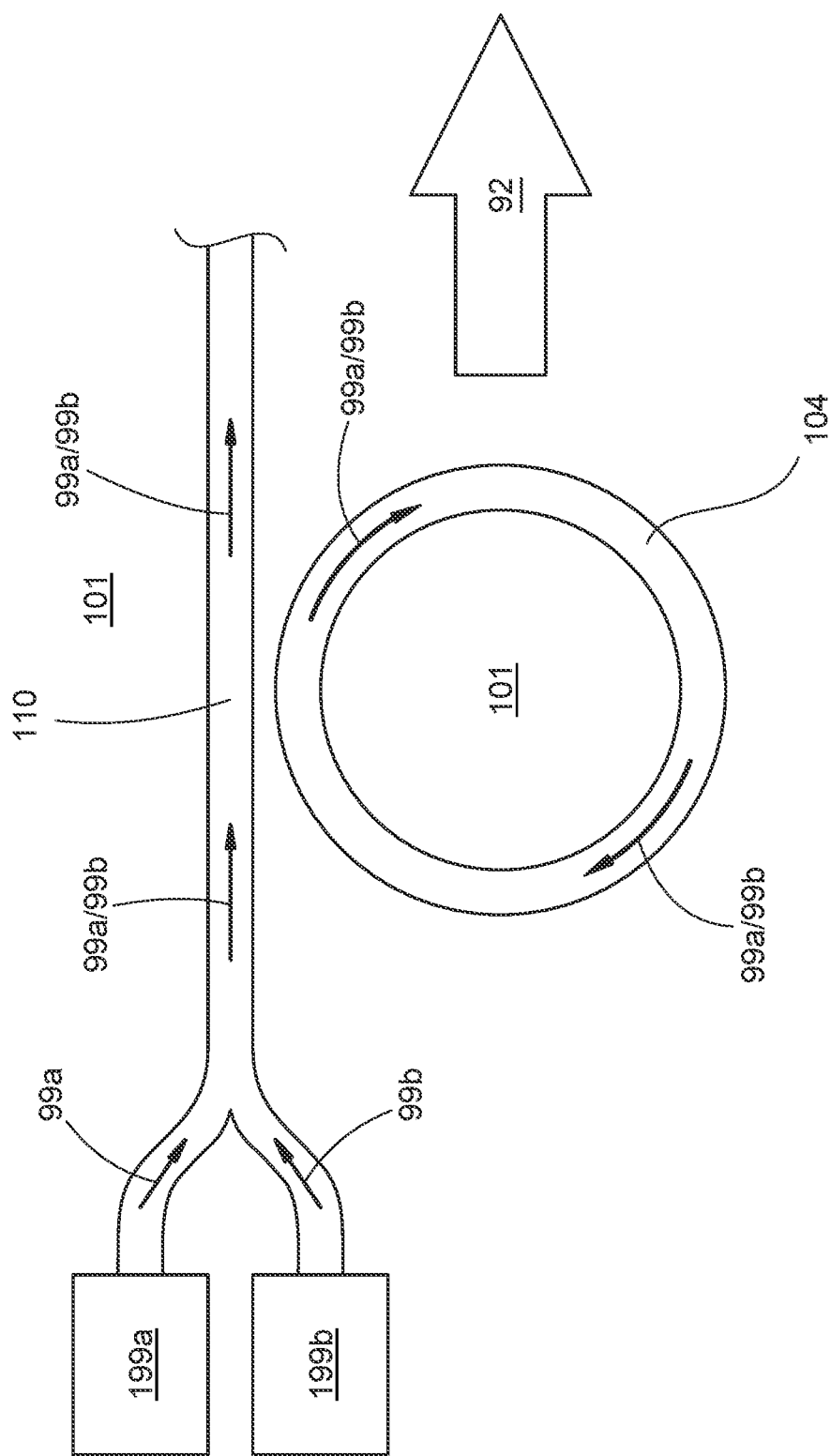
Figure 10:
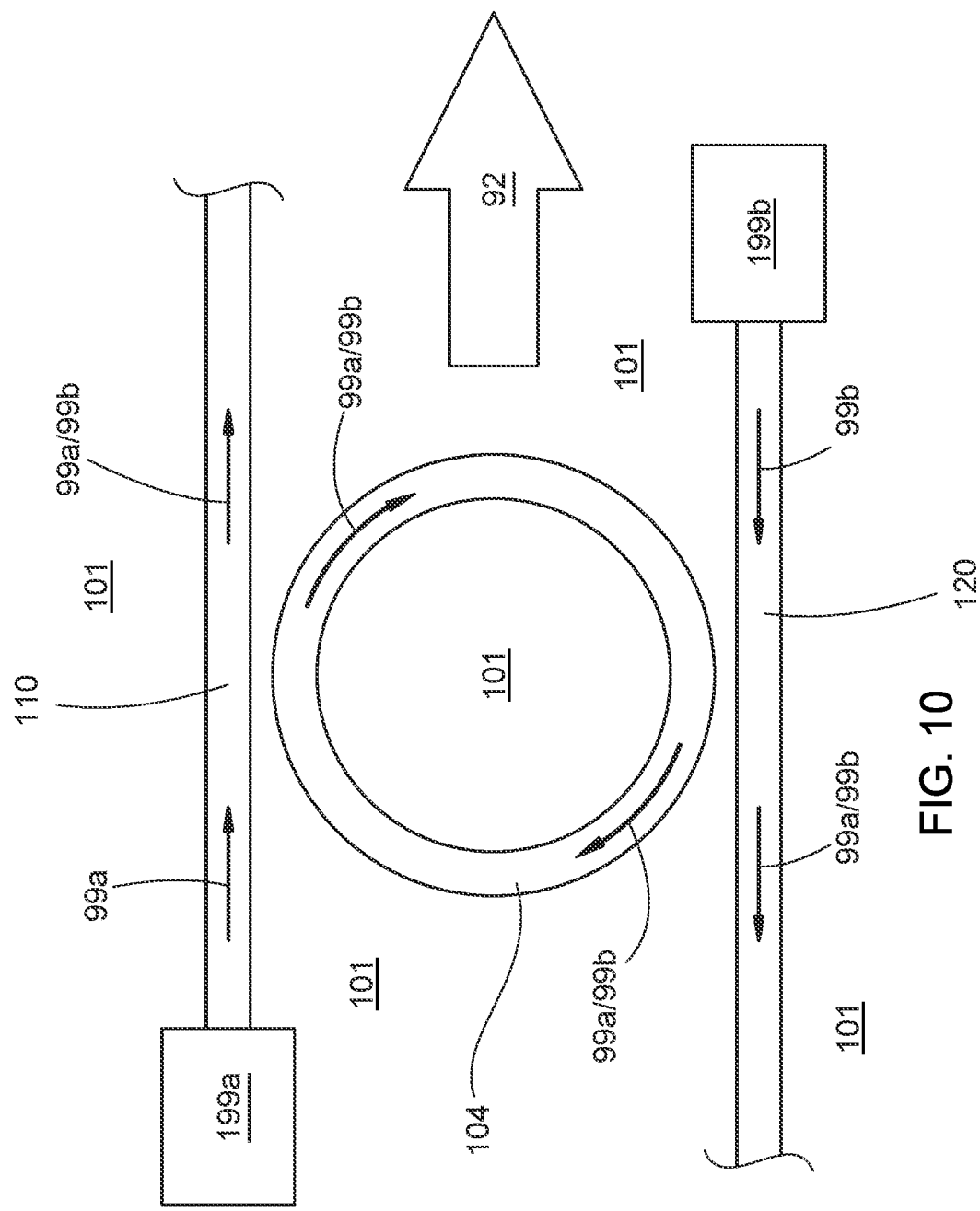

In the example of FIG. 9, the input optical signals 99a/99b are combined to propagate along the optical waveguide 110 toward the optical resonator 104. In the example of FIG. 10, the input optical signal 99a propagates along the optical waveguide 110 toward the optical resonator 104, while the input optical signal 99b propagates along a different optical waveguide 120 toward the optical resonator 104. In both examples, portions of the input optical signals 99a/99b are evanescently coupled to propagate around the optical resonator 104. One or both of the optical resonator 104 or the substrate 101 include one or more nonlinear optical materials (as described above), and are arranged so that the optical signals 99a/99b propagating around the resonator 104 generate the output electromagnetic signal 92 by difference frequency generation (DFG). Any suitable arrangement of one or more nonlinear optical materials can be employed for producing the output electromagnetic signal 92 by difference-frequency generation of the two input optical signals 99a/99b by any suitable nonlinear optical process, including any of those described above. While the output electromagnetic signal 92 is shown in the drawings propagating away from the resonator 104 in the plane of the substrate 101, resonator 104, and waveguide 110 (i.e., in the plane of the drawings), an inventive apparatus can be arranged to generate the output electromagnetic signal 92 to propagate away from the resonator 104 in any desired direction, including out of the plane of the resonator 104 (as described above for the incident electromagnetic signal 91).

Figure 13A:
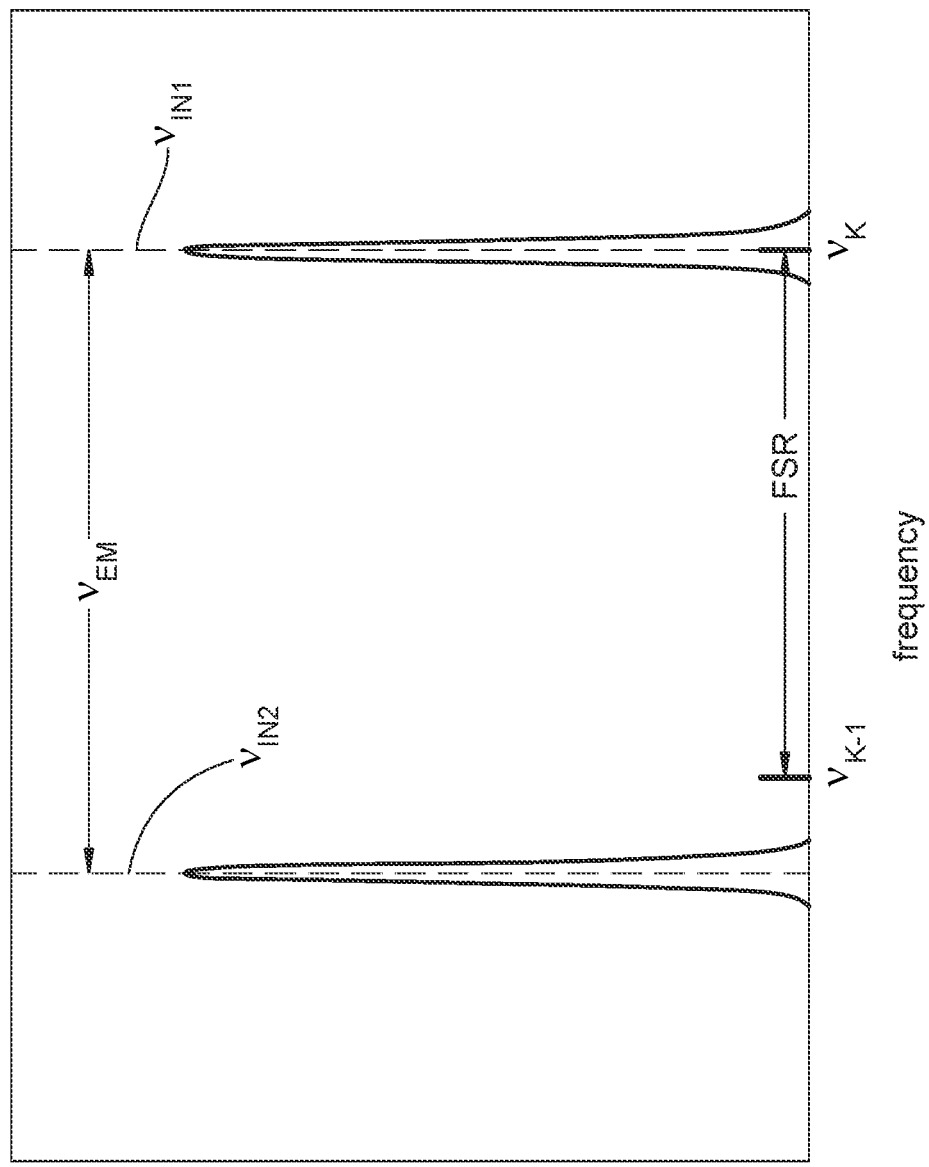
FIGS. 13A through 13D are example spectra of input optical frequencies and resonator optical frequencies for several examples of inventive apparatus.
Figure 13B:
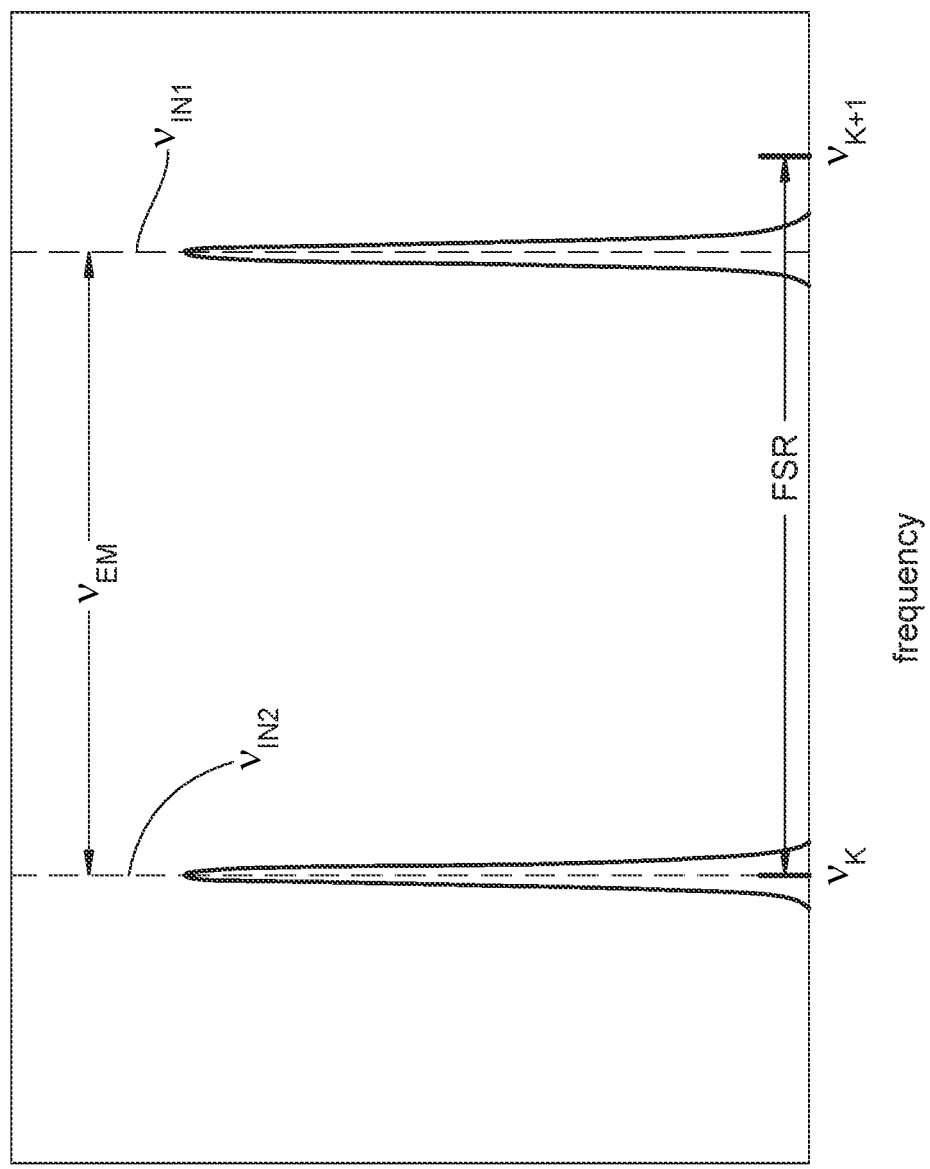
Figure 13C:
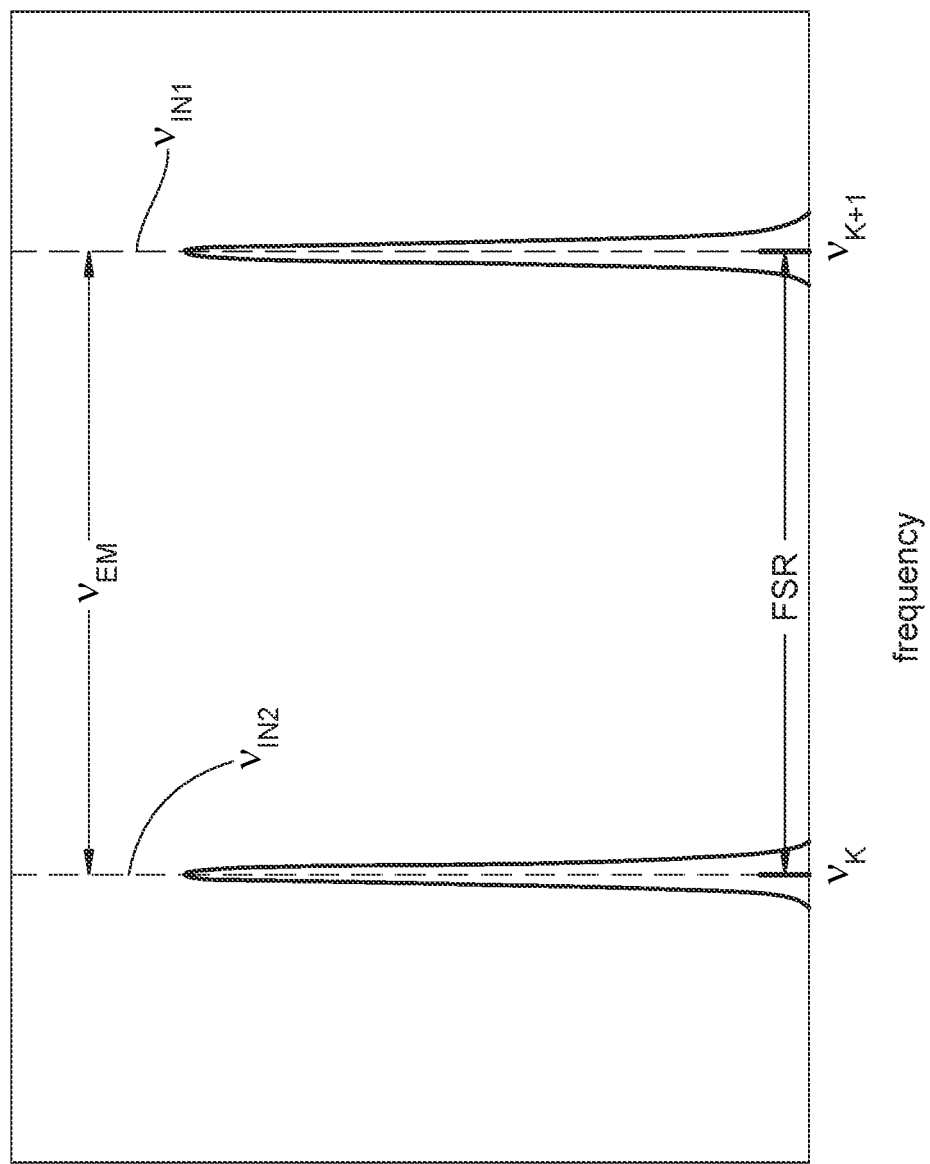
Figure 13D:
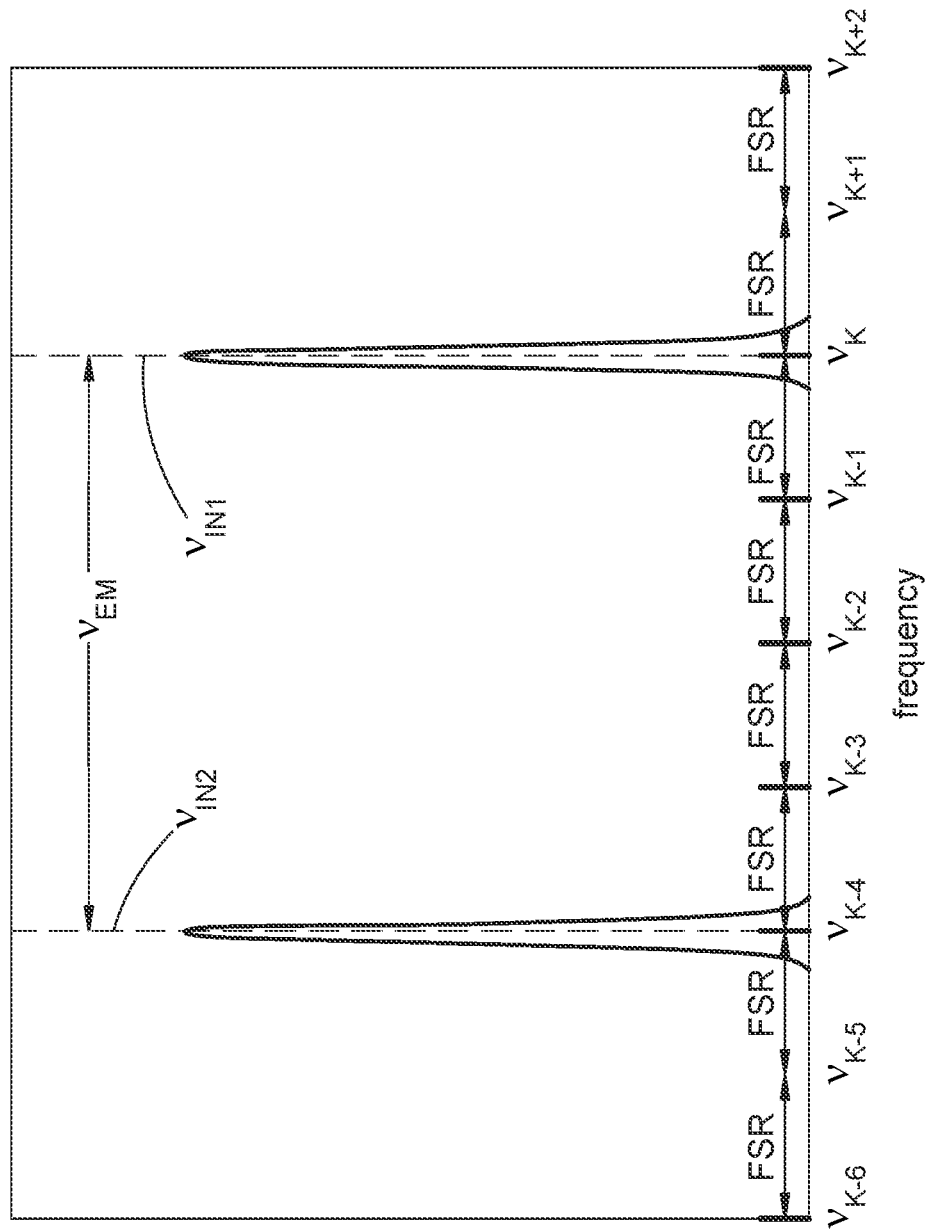

Evanescent coupling between the resonator 104 and input waveguide 110 (or unput waveguide 110 and 120) can be arranged in any suitable way. One or both of the input optical signals 99a or 99b can have a corresponding optical frequency $v_{IN1}$ or $v_{IN2}$ about equal to a corresponding resonant optical frequency of the optical resonator 104 (e.g., as in FIGS. 13A-13D). Under those operating conditions, the resonance enhancement of the optical power level of one or both input optical signals 99a/99b propagating around the resonator 104 also enhances the efficiency of the difference frequency generation process that generates the output electromagnetic signal 92. Any suitable arrangement can be employed for maintain a near match between one or both of the input optical frequencies $v_{IN1}$ or $v_{IN2}$ and one or more resonant optical modes of the optical resonator 104, including those arrangements described above or illustrated schematically in FIG. 3 or 4. In some examples (e.g., as in FIGS. 13A and 13B), only one of the input optical frequencies $v_{IN1}$ or $v_{IN2}$ is matched to a resonant optical mode of the resonator 104 ($v_{IN1}$ in FIG. 13A; $v_{IN2}$ in FIG. 13B). In some examples (e.g., as in FIGS. 13C and 13D), both of the input optical frequencies $v_{IN1}$ and $v_{IN2}$ are matched to corresponding resonant optical modes of the resonator 104 (adjacent modes separated by the FSR in FIG. 13C; non-adjacent modes separated by an integer multiple of the FSR in FIG. 13D). Any suitable size, arrangement, materials, or free spectral range can be employed for the resonator 104, including those described above.

Figure 11:
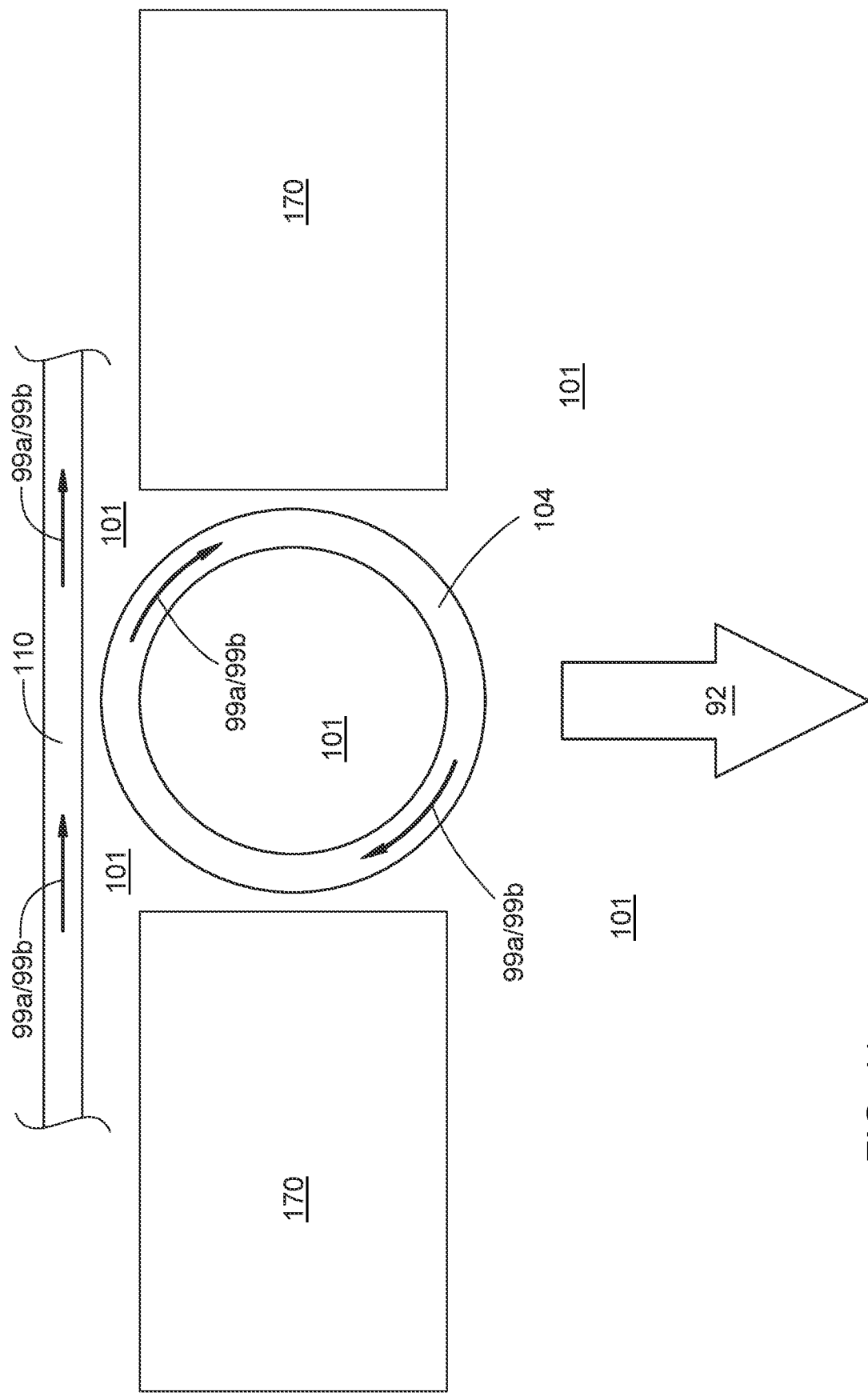

In some examples (e.g., as in FIG. 11), one or more electrically conductive traces 170 on the substrate 101 can be arranged as an antenna 170 for enhancing or directing the output electromagnetic signal 92. Any suitable arrangement of the antenna 170 can be employed, including any of those described above.

In any arrangements in which an electromagnetic output signal 92 is generated by difference-frequency generation of the optical input signal 99a/99b (including those described or shown herein), the output signal 92 can be modulated so as to encode information to be transmitted by propagation of the output electromagnetic signal 92 away from the resonator 104. In some examples, an amplitude-modulated output signal 92 can be generated by amplitude modulation of one or both of the input optical signals 99a or 99b. In some examples, a phase- or frequency-modulated output signal 92 can be generated by phase or frequency modulation of one or both of the input optical signals 99a or 99b. In some examples, a modulated output signal 92 can be produced by modulation of resonant frequencies or other characteristics of the resonator 104. Whatever arrangement is employed for modulating the output electromagnetic signal 92, information can be encoded onto the output signal 92 according to any suitable modulation scheme, including any of those described above.

In some examples (e.g., as in FIG. 12), an array of resonators 104 can be arranged on the substrate 101 with corresponding optical waveguides 110 and 120. Such an array can be used in a number of ways. In some examples, by selectively propagating one or both of the input optical signals 99a or 99b along only selected waveguides 110 or 120, an image can be created from the output electromagnetic signals 92 generated at each activated resonator 104. In such an arrangement, each resonator 104 acts as a "pixel" that can be selectively activated by selectively propagating one or both input optical signals 99a or 99b along the corresponding waveguide 110 or 120.

In some other examples, directionality of the combined output electromagnetic signals 92 of the resonators 104 can be altered or controlled by altering or controlling relative phases, among the multiple resonators 104, of each of individual output signals 92. In such an arrangement each resonator 104 can act as one "antenna" of a phased antenna array. For example, a linear variation of relative phases with position across the array of resonators 104 can result in an angular distribution of the output signal 92 that exhibits a preferred direction of propagation. The width of the angular distribution is related to the number of resonators 104 in the array; more resonators 104 can result in a narrower angular distribution. Relative phases of one or both input optical signals 99a/99b can be altered or controlled in any suitable way, e.g., by incorporating phase modulators into the waveguides 110 or 120 to phase modulate one or both of the input optical signals 99a or 99b, or by modulation of optical properties of the resonators 104.

In addition to the preceding, the following example embodiments fall within the scope of the present disclosure or appended claims:

Example 1. An apparatus comprising: (a) a substrate; (b) a ring optical resonator on the substrate, the ring optical resonator being arranged so as to support one or more resonant optical modes; and (c) an input optical waveguide on the substrate, the input optical waveguide being arranged so as to support one or more propagating input optical modes, the input optical waveguide and the ring optical resonator being arranged and positioned so as to establish evanescent optical coupling therebetween, (d) the ring optical resonator, the substrate, or both including one or more nonlinear optical materials, (e) the ring optical resonator and the input optical waveguide being arranged so as to generate, from (i) an input optical signal at an input optical frequency $\nu_{IN}$ propagating along the input optical waveguide in one or more propagating input optical modes and around the ring optical resonator in one or more resonant optical modes and (ii) a millimeter-wave or sub-millimeter-wave electromagnetic signal at an electromagnetic frequency $\nu_{EM}$ incident on the ring optical resonator, one or more sideband optical signals that propagate around the ring optical resonator at corresponding optical sideband frequencies $\nu_{SF}=\nu_{IN}+\nu_{EM}$ or $\nu_{DF}=\nu_{IN}-\nu_{EM}$.

Example 2. The apparatus of Example 1 wherein the input optical frequency $\nu_{IN}$ is between $1.0\times10^{14}$ Hz and $1.0\times10^{15}$ Hz.

Example 3. The apparatus of any one of Examples 1 or 2 wherein the input optical frequency $\nu_{IN}$ is corresponds to a vacuum wavelength between 0.8 μm and 1.7 μm.

Example 4. The apparatus of any one of Examples 1 through 3 wherein the electromagnetic frequency $\nu_{EM}$ is between 0.030 THz and 0.30 THz.

Example 5. The apparatus of any one of Examples 1 through 3 wherein the electromagnetic frequency $\nu_{EM}$ is between 0.30 THz and 30. THz.

Example 6. The apparatus of any one of Examples 1 through 5 wherein the electromagnetic frequency $\nu_{EM}$ is between 0.030 THz and 0.10 THz, between 0.10 THz and 0.30 THz, between 0.30 THz and 1.0 THz, between 1.0 THz and 3.0 THz, between 3.0 THz and 10. THz, between 10. THz and 30. THz, or combinations thereof.

Example 7. The apparatus of any one of Examples 1 through 6, the ring optical resonator comprising a higher-index core surrounded by a lower-index cladding.

Example 8. The apparatus of any one of Examples 1 through 7, the substrate including one or more nonlinear optical materials at or on a surface thereof, and the ring optical resonator comprising a ridge optical waveguide formed on the surface of the substrate.

Example 9. The apparatus of any one of Examples 1 through 8, the ring optical resonator comprising a ridge optical waveguide formed on a surface of the substrate and including one or more nonlinear optical materials.

Example 10. The apparatus of any one of Examples 1 through 9, the one or more nonlinear optical materials including one or more of: gallium arsenide or gallium phosphide or other III-V semiconductors or alloys thereof; one or more II-VI semiconductors or alloys thereof; one or more of DAST (4-N,N-dimethylamino-4'-N'-methyl-stilbazolium tosylate), OH1 (2-(3-(4-hydroxystyryl)-5,5-dimethylcyclohex-2-enylidene) malononitrile), or DSTMS (4-N,N-dimethylamino-4'-N'-methyl-stilbazolium 2,4,6-trimethylbenzenesulfonate), or other organic material exhibiting suitable nonlinear optical properties; one or more polymers exhibiting suitable nonlinear optical properties; potassium or lithium niobate or other inorganic material exhibiting suitable nonlinear optical properties; or other suitable nonlinear optical materials.

Example 11. The apparatus of any one of Examples 1 through 10 further comprising an optical detector arranged so as to receive at least a portion of the one or more sideband optical signals and generate therefrom one or more corresponding electrical signals indicative of presence or intensity of the electromagnetic signal.

Example 12. The apparatus of Example 11, the optical detector comprising a photoconductive or photovoltaic p-i-n photodiode, an avalanche photodiode, or a photo multiplier.

Example 13. The apparatus of any one of Examples 11 or 12 wherein: (i) the optical detector is arranged so as to directly generate the one or more electrical signals; (ii) the apparatus further comprises a continuous-wave local-oscillator laser source that produces a local-oscillator optical signal characterized by a local-oscillator optical frequency either $\nu_{LO}=\nu_{SF}$ or $\nu_{LO}=\nu_{DF}$, and the optical detector is arranged so as to receive both sideband and local-oscillator optical signals in an intradyne or homodyne arrangement to generate the one or more electrical signals; or (iii) the optical detector is arranged so as to receive both sideband and residual input optical signals in a heterodyne arrangement to generate the one or more electrical signals.

Example 14. The apparatus of any one of Examples 11 through 13 further comprising a signal processing system connected to the optical detector, the signal processing system being structured and connected so as to receive the one or more electrical signals, demodulate the one or more electrical signals, and decode transmitted information encoded by modulation of the electromagnetic signal.

Example 15. The apparatus of Example 14 wherein the signal processing system is arranged so as to decode the transmitted information encoded by the electromagnetic signal according to an analog modulation scheme.

Example 16. The apparatus of Example 14 wherein the signal processing system is arranged so as to decode the transmitted information encoded by the electromagnetic signal according to a digital modulation scheme.

Example 17. The apparatus of Example 14 wherein the signal processing system is arranged so as to decode the transmitted information encoded by the electromagnetic signal according to a QAM modulation scheme, a PSK modulation scheme, or a PAM modulation scheme.

Example 18. The apparatus of any one of Examples 14 through 17 wherein the signal processing system is arranged so as to decode the transmitted information at a data rate greater than $5 \times 10^9$ bps, greater than $1.0 \times 10^{10}$ bps, greater than $2.0 \times 10^{10}$ bps, greater than $5 \times 10^{10}$ bps, greater than $1.0 \times 10^{11}$ bps, greater than $2.0 \times 10^{11}$ bps, or greater than $5 \times 10^{11}$ bps.

Example 19. The apparatus of any one of Examples 1 through 18 further comprising one or more polarization-selective optical components or one or more wavelength-selective optical components positioned and arranged so as to
(i) selectively direct or transmit portions of one or more of the sideband optical signals to propagate to the optical detector and (ii) selectively reduce direction or transmission of the input optical signal propagating to the optical detector.

Example 20. The apparatus of any one of Examples 1 through 19, the ring optical resonator and the substrate being arranged so as to generate the one or more sideband optical signals with at least a component of a propagation direction of the electromagnetic signal being parallel to the substrate surface.

Example 21. The apparatus of any one of Examples 1 through 20, the ring optical resonator and the substrate being arranged so as to generate the one or more sideband optical signals with at least a component of a propagation direction of the electromagnetic signal being perpendicular to the substrate surface.

Example 22. The apparatus of any one of Examples 1 through 21, the ring optical resonator, the input optical waveguide, and the substrate being arranged so as to generate the one or more sideband optical signals with at least a component of a propagation direction of the electromagnetic signal being parallel to that portion of the input optical waveguide evanescently coupled to the ring optical resonator.

Example 23. The apparatus of any one of Examples 1 through 22, the ring optical resonator, the input optical waveguide, and the substrate being arranged so as to generate the one or more sideband optical signals with at least a component of a propagation direction of the electromagnetic signal being perpendicular to that portion of the input optical waveguide evanescently coupled to the ring optical resonator.

Example 24. The apparatus of any one of Examples 1 through 23, the evanescent optical coupling between the ring optical resonator and the input optical waveguide resulting in at least a portion of one or more of the generated sideband optical signals propagating along the input optical waveguide.

Example 25. The apparatus of any one of Examples 1 through 24 further comprising an output optical waveguide on the substrate, the output optical waveguide being arranged so as to support one or more propagating output optical modes, the output optical waveguide and the ring optical resonator being arranged and positioned so as to establish evanescent optical coupling therebetween that results in at least a portion of one or more of the generated sideband optical signals propagating along the output optical waveguide.

Example 26. The apparatus of Example 25 further comprising an auxiliary ring optical resonator on the substrate, the auxiliary ring optical resonator being arranged so as to support one or more auxiliary resonant optical modes, the auxiliary ring optical resonator being arranged and positioned so as to establish evanescent optical coupling with the ring optical resonator and with the output optical waveguide, resulting in the evanescent optical coupling between the ring optical resonator and the output optical waveguide.

Example 27. The apparatus of Example 26, one or more of the auxiliary resonant optical modes having a corresponding resonant optical frequency about equal to $v_{SF}$ or $v_{DF}$.

Example 28. The apparatus of any one of Examples 1 through 27, one or more of the resonant optical modes having a corresponding resonant optical frequency about equal to $v_{IN}$.

Example 29. The apparatus of any one of Examples 1 through 28, one or more of the resonant optical modes having a corresponding resonant optical frequency about equal to $v_{SF}$ or $v_{DF}$.

Example 30. The apparatus of any one of Examples 1 through 29, the ring optical resonator exhibiting a free spectral range about equal to $v_{EM}$ or $v_{EM}$ IN where N is an integer.

Example 31. The apparatus of any one of Examples 1 through 30 further comprising one or more electrodes on the substrate that are positioned and arranged relative to the ring optical resonator so that resonant optical frequencies of the resonant optical modes vary according to corresponding voltages applied to the one or more electrodes.

Example 32. The apparatus of any one of Examples 1 through 31 further comprising an input optical source positioned and arranged so as to generate the input optical signal and launch the input optical signal to propagate along the input optical waveguide.

Example 33. The apparatus of Example 32, the input optical source being a laser source that is frequency-locked to a corresponding resonant optical mode of the ring optical resonator.

Example 34. The apparatus of Example 33, the laser source being frequency-locked to the corresponding resonant optical mode of the ring optical resonator by a Pound-Drever-Hall mechanism or by a Hänsch-Couillaud mechanism.

Example 35. The apparatus of any one of Examples 1 through 34 further comprising one or more electrically conductive traces on the substrate arranged as an antenna for the electromagnetic signal and positioned relative to the ring optical resonator so as to enhance generation of the one or more sideband optical signals.

Example 36. The apparatus of any one of Examples 1 through 35 further comprising a one- or two-dimensional array of additional ring optical resonators on the substrate and, for each additional optical resonator of the array, a corresponding additional input optical waveguide positioned for evanescent optical coupling between that resonator of the array and the corresponding input optical waveguide, each additional ring optical resonator and corresponding additional input optical waveguide being arranged so as to generate, from (i) one or more corresponding portions of the input optical signal at the input optical frequency $v_{IN}$ propagating along one or more of the additional input optical waveguides and around the corresponding additional ring optical resonators and (ii) the electromagnetic signal at the electromagnetic frequency $v_{EM}$ incident on one or more of the additional ring optical resonators, one or more additional sideband optical signals that propagate around the corresponding additional ring optical resonators at the corresponding optical sideband frequencies $v_{SF} = v_{IN} + v_{EM}$ or $v_{DF} = v_{IN} - v_{EM}$.

Example 37. The apparatus of Example 36 further comprising multiple optical detectors, each arranged for receiving a corresponding sideband optical signal generated at a corresponding additional optical resonator so that the resonators and optical detectors act together as an imaging array for the incident electromagnetic signal.

Example 38. A method for using the apparatus of any one of Examples 31 through 37, the method comprising applying corresponding voltages to the one or more electrodes so that the ring optical resonator exhibits a selected resonant optical frequency.

Example 39. The method of Example 38, the selected resonant optical frequency being about equal to $v_{IN}$, $v_{SF}$, or $v_{DF}$.

Example 40. A method for using the apparatus of any one of Examples 31 through 37, the method comprising applying corresponding voltages to the one or more electrodes so that the ring optical resonator exhibits a selected free spectral range.

Example 41. The method of Example 40, the selected free spectral range being about equal to $v_{EM}$ or $v_{EM}/N$ where N is an integer.

Example 42. A method for using the apparatus of any one of Examples 1 through 37, the method comprising: (A) positioning the substrate or directing the electromagnetic signal so that the electromagnetic signal is incident on at least a portion of the ring optical resonator; and (B) launching the input optical signal to propagate along the input optical waveguide in one or more propagating input optical modes and around the ring optical resonator in one or more resonant optical modes, resulting in generation of the one or more sideband optical signals that propagate around the ring optical resonator at the corresponding optical sideband frequencies $v_{SF}$ or $v_{DF}$.

Example 43. A method for using the apparatus of any one of Examples 11 through 37, the method comprising: (A) positioning the substrate or directing the electromagnetic signal so that the electromagnetic signal is incident on at least a portion of the ring optical resonator; (B) launching the input optical signal to propagate along the input optical waveguide in one or more propagating input optical modes and around the ring optical resonator in one or more resonant optical modes, resulting in generation of the one or more sideband optical signals that propagate around the ring optical resonator at the corresponding optical sideband frequencies $v_{SF}$ or $v_{DF}$; and (C) receiving with the optical detector at least a portion of the one or more sideband optical signals and generating therefrom a corresponding electrical signal indicative of presence or intensity of the electromagnetic signal.

Example 44. A method for using the apparatus of any one of Examples 14 through 37, the method comprising: (A) positioning the substrate or directing the electromagnetic signal so that the electromagnetic signal is incident on at least a portion of the ring optical resonator; (B) launching the input optical signal to propagate along the input optical waveguide in one or more propagating input optical modes and around the ring optical resonator in one or more resonant optical modes, resulting in generation of the one or more sideband optical signals that propagate around the ring optical resonator at the corresponding optical sideband frequencies $v_{SF}$ or $v_{DF}$; (C) receiving with the optical detector at least a portion of the one or more sideband optical signals and generating therefrom a corresponding electrical signal indicative of presence or intensity of the electromagnetic signal; and (D) using the signal processing system, demodulating the one or more electrical signals, and decoding transmitted information encoded by modulation of the electromagnetic signal.

Example 45. A method for using the apparatus of any one of Examples 32 through 37, the method comprising: (A) positioning the substrate or directing the electromagnetic signal so that the electromagnetic signal is incident on at least a portion of the ring optical resonator; (B) operating the input optical source to generate the input optical signal; and (C) launching the input optical signal to propagate along the input optical waveguide in one or more propagating input optical modes and around the ring optical resonator in one or more resonant optical modes, resulting in generation of the one or more sideband optical signals that propagate around the ring optical resonator at the corresponding optical sideband frequencies $v_{SF}$ or $v_{DF}$.

Example 46. A method for using the apparatus of any one of Examples 36 or 37, the method comprising: (A) positioning the substrate or directing the electromagnetic signal so that the electromagnetic signal is incident on one or more of the additional ring optical resonators; and (B) launching the input optical signal to propagate along one or more of the additional input optical waveguides and around the corresponding additional ring optical resonators, resulting in generation of the one or more additional sideband optical signals that propagate around the corresponding additional ring optical resonators at the corresponding optical sideband frequencies $v_{SF}$ or $v_{DF}$.

Example 47. A method for using the apparatus of Example 37, the method comprising: (A) positioning the substrate or directing the electromagnetic signal so that the electromagnetic signal is incident on one or more of the additional ring optical resonators; (B) launching the input optical signal to propagate along one or more of the additional input optical waveguides and around the corresponding additional ring optical resonators, resulting in generation of the one or more additional sideband optical signals that propagate around the corresponding additional ring optical resonators at the corresponding optical sideband frequencies $v_{SF}$ or $v_{DF}$; and (C) receiving with one or more of the multiple optical detectors corresponding portions of the one or more additional sideband optical signals and generating therefrom corresponding electrical signals collectively indicative of at least a portion of an image of the electromagnetic signal.

Example 48. An apparatus comprising: (a) a substrate; (b) a ring optical resonator on the substrate, the ring optical resonator being arranged so as to support one or more resonant optical modes; and (c) one or more input optical waveguides on the substrate, each input optical waveguide being arranged so as to support one or more corresponding propagating input optical modes, each input optical waveguide and the ring optical resonator being arranged and positioned so as to establish evanescent optical coupling therebetween, (d) the ring optical resonator, the substrate, or both including one or more nonlinear optical materials, (e)

the ring optical resonator and one or more of the one or more input optical waveguides being arranged so as to generate, from first and second input optical signals at respective input optical frequencies $v_{IN1}$ and $v_{IN2}$ propagating along one or more of the one or more input optical waveguides in one or more propagating input optical modes and around the ring optical resonator in one or more resonant optical modes, a millimeter-wave or sub-millimeter-wave electromagnetic signal that propagates away from the optical resonator at an electromagnetic frequency $v_{EM}$, with $v_{EM}=|v_{IN1}-v_{IN2}|$.

Example 49. The apparatus of Example 48 wherein the input optical frequencies $v_{IN1}$ and $v_{IN2}$ are between $1.0\times10^{14}$ Hz and $1.0\times10^{15}$ Hz.

Example 50. The apparatus of any one of Examples 48 or 49 wherein the input optical frequencies $v_{IN1}$ and $v_{IN2}$ correspond to vacuum wavelengths between 0.8 μm and 1.7 μm.

Example 51. The apparatus of any one of Examples 48 through 50 wherein the electromagnetic frequency $v_{EM}$ is between 0.030 THz and 0.30 THz.

Example 52. The apparatus of any one of Examples 48 through 50 wherein the electromagnetic frequency $v_{EM}$ is between 0.30 THz and 30. THz.

Example 53. The apparatus of any one of Examples 48 through 52 wherein the electromagnetic frequency $v_{EM}$ is between 0.030 THz and 0.10 THz, between 0.10 THz and 0.30 THz, between 0.30 THz and 1.0 THz, between 1.0 THz and 3.0 THz, between 3.0 THz and 10. THz, between 10. THz and 30. THz, or combinations thereof.

Example 54. The apparatus of any one of Examples 48 through 53, the ring optical resonator comprising a higher-index core surrounded by a lower-index cladding.

Example 55. The apparatus of any one of Examples 48 through 54, the substrate including one or more nonlinear optical materials at or on a surface thereof, and the ring optical resonator comprising a ridge optical waveguide formed on the surface of the substrate.

Example 56. The apparatus of any one of Examples 48 through 55, the ring optical resonator comprising a ridge optical waveguide formed on a surface of the substrate and including one or more nonlinear optical materials.

Example 57. The apparatus of any one of Examples 48 through 56, the one or more nonlinear optical materials including one or more of: gallium arsenide or gallium phosphide or other III-V semiconductors or alloys thereof; one or more II-VI semiconductors or alloys thereof; one or more of DAST (4-N,N-dimethylamino-4'-N'-methyl-stilbazolium tosylate), OH1 (2-(3-(4-hydroxystyryl)-5,5-dimethylcyclohex-2-enylidene) malononitrile), or DSTMS (4-N,N-dimethylamino-4'-N'-methyl-stilbazolium 2,4,6-trimethylbenzenesulfonate), or other organic material exhibiting suitable nonlinear optical properties; one or more polymers exhibiting suitable nonlinear optical properties; potassium or lithium niobate or other inorganic material exhibiting suitable nonlinear optical properties; or other suitable nonlinear optical materials.

Example 58. The apparatus of any one of Examples 48 through 57 further comprising a modulation system operatively coupled to one or more of the resonator, a source of the first input optical signal, or a source of the second input optical signal, the modulation system being structured and connected so as to receive one or more electrical signals modulated to encode transmitted information and to modulate the electromagnetic output signal to encode the transmitted information.

Example 59. The apparatus of Example 58 wherein the modulation system is arranged so as to encode the transmitted information onto the electromagnetic signal according to an analog modulation scheme.

Example 60. The apparatus of Example 58 wherein the modulation system is arranged so as to encode the transmitted information onto the electromagnetic signal according to a digital modulation scheme.

Example 61. The apparatus of Example 58 wherein the modulation system is arranged so as to encode the transmitted information onto the electromagnetic signal according to a QAM modulation scheme, a PSK modulation scheme, or a PAM modulation scheme.

Example 62. The apparatus of any one of Examples 58 through 61 wherein the modulation system is arranged so as to encode the transmitted information at a data rate greater than $5\times10^9$ bps, greater than $1.0\times10^{10}$ bps, greater than $2.0\times10^{10}$ bps, greater than $5\times10^{10}$ bps, greater than $1.0\times10^{11}$ bps, greater than $2.0\times10^{11}$ bps, or greater than $5\times10^{11}$ bps.

Example 63. The apparatus of any one of Examples 58 through 62 wherein the modulation system is operatively coupled to one or both of the sources of the first and second input optical signals and arranged so as to modulate one or both of the first or second input optical signals to effect modulation of the output electromagnetic signal.

Example 64. The apparatus of any one of Examples 58 through 63 wherein the modulation system is operatively coupled to the optical resonator and arranged so as to modulate one or more characteristics of the optical resonator to effect modulation of the output electromagnetic signal.

Example 65. The apparatus of any one of Examples 48 through 64, the ring optical resonator and the substrate being arranged so that at least a component of a propagation direction of the output electromagnetic signal is parallel to the substrate surface.

Example 66. The apparatus of any one of Examples 48 through 65, the ring optical resonator and the substrate being arranged so that a component of a propagation direction of the output electromagnetic signal is perpendicular to the substrate surface.

Example 67. The apparatus of any one of Examples 48 through 66, the ring optical resonator, one of the one or more input optical waveguides, and the substrate being arranged so that at least a component of a propagation direction of the output electromagnetic signal is parallel to that portion of the input optical waveguide evanescently coupled to the ring optical resonator.

Example 68. The apparatus of any one of Examples 48 through 67, the ring optical resonator, one of the one or more input optical waveguides, and the substrate being arranged so that at least a component of a propagation direction of the output electromagnetic signal is perpendicular to that portion of the input optical waveguide evanescently coupled to the ring optical resonator.

Example 69. The apparatus of any one of Examples 48 through 68 wherein the one or more input optical waveguides include at least first and second input optical waveguides, the first input optical signal propagates along the first input optical waveguide, and the second input optical signal propagates along the second input optical waveguide.

Example 70. The apparatus of any one of Examples 48 through 69, at least one of the resonant optical modes having a corresponding resonant optical frequency about equal to $v_{IN1}$ or about equal to $v_{IN}2$.

Example 71. The apparatus of any one of Examples 48 through 70, at least one of the resonant optical modes having a corresponding resonant optical frequency about equal to $v_{IN1}$ and at least one of the resonant optical modes having a corresponding resonant optical frequency about equal to $v_{IN2}$.

Example 72. The apparatus of any one of Examples 48 through 71, the ring optical resonator exhibiting a free spectral range about equal to $v_{EM}$ or $v_{EM}$ IN where N is an integer.

Example 73. The apparatus of any one of Examples 48 through 72 further comprising one or more electrodes on the substrate that are positioned and arranged relative to the ring optical resonator so that resonant optical frequencies of the resonant optical modes vary according to corresponding voltages applied to the one or more electrodes.

Example 74. The apparatus of any one of Examples 48 through 73 further comprising respective first and second input optical sources positioned and arranged so as to generate the first and second input optical signals and launch the first and second input optical signal to propagate along one or more of the one or more input optical waveguides.

Example 75. The apparatus of Example 74 wherein the first and second input optical sources are arranged so that both the first and second input optical signals propagate along the same one of the one or more input optical waveguides.

Example 76. The apparatus of Example 74 wherein the first and second input optical sources are arranged so that the first input optical signal propagates along a first one of the one or more input optical waveguides and the second input optical signal propagates along a second one of the one or more input optical waveguides.

Example 77. The apparatus of any one of Examples 74 through 76, at least one of the input optical sources being a laser source that is frequency-locked to a corresponding resonant optical mode of the ring optical resonator.

Example 78. The apparatus of any one of Examples 74 through 77, each one of the input optical sources being a laser source that is frequency-locked to a corresponding resonant optical mode of the ring optical resonator.

Example 79. The apparatus of any one of Examples 77 or 78, each frequency-locked laser source being frequency-locked to the corresponding resonant optical mode of the ring optical resonator by a Pound-Drever-Hall mechanism or by a Hänsch-Couillaud mechanism.

Example 80. The apparatus of any one of Examples 48 through 79 further comprising one or more electrically conductive traces on the substrate arranged as an antenna for the output electromagnetic signal and positioned relative to the ring optical resonator so as to enhance or direct generation of the output electromagnetic signal.

Example 81. The apparatus of any one of Examples 48 through 80 further comprising a one- or two-dimensional array of additional ring optical resonators on the substrate and, for each additional optical resonator of the array, corresponding one or more additional input optical waveguides positioned for evanescent optical coupling between that resonator of the array and the corresponding one or more input optical waveguides, each additional ring optical resonator and corresponding additional input optical waveguide being arranged so as to generate, from first and second input optical signals at respective input optical frequencies $v_{IN1}$ and $v_{IN2}$ propagating along one or more of the one or more additional input optical waveguides in one or more propagating input optical modes and around the ring optical resonator in one or more resonant optical modes, a millimeter-wave or sub-millimeter-wave electromagnetic signal at an electromagnetic frequency $v_{EM}$, with $v_{EM}=|v_{IN1}-v_{IN2}|$.

Example 82. A method for using the apparatus of Example 81, the method comprising selectively activating certain optical resonators of the array to emit corresponding output electromagnetic signals that collectively form an image.

Example 83. A method for using the apparatus of Example 81, the method comprising operating the array so that the resonators emit corresponding output electromagnetic signals that exhibit corresponding relative phases that vary with position across the array, the varying relative phases resulting in combined output electromagnetic signals exhibiting a corresponding directionality of propagation away from the array.

Example 84. A method for using the apparatus of any one of Examples 73 through 81, the method comprising applying corresponding voltages to the one or more electrodes so that the ring optical resonator exhibits a selected resonant optical frequency.

Example 85. The method of Example 84, the selected resonant optical frequency being about equal to $v_{IN1}$ or $v_{IN2}$.

Example 86. A method for using the apparatus of any one of Examples 73 through 81, the method comprising applying corresponding voltages to the one or more electrodes so that the ring optical resonator exhibits a selected free spectral range.

Example 87. The method of Example 86, the selected free spectral range being about equal to $v_{EM}$ or $v_{EM}/N$ where N is an integer.

Example 88. A method for using the apparatus of any one of Examples 48 through 81, the method comprising launching the first and second input optical signals to propagate along one or more of the one or more input optical waveguides in one or more propagating input optical modes and around the ring optical resonator in one or more resonant optical modes, resulting in generation of the output electromagnetic signal that propagates away from the optical resonator.

Example 89. A method for using the apparatus of any one of Examples 58 through 81, the method comprising: (A) launching the first and second input optical signals to propagate along one or more of the one or more input optical waveguides in one or more propagating input optical modes and around the ring optical resonator in one or more resonant optical modes, resulting in generation of the output electromagnetic signal; and (B) using the modulation system, in response to receiving one or more electrical signals modulated to encode transmitted information, modulating one or more of the first input optical signal, the second input optical signal, or one or more characteristics of the optical resonator, so as to effect modulation of the output electromagnetic signal to encode the transmitted information.

Example 90. A method for using the apparatus of any one of Examples 74 through 81, the method comprising: (A) operating the first and second input optical sources to generate the respective first and second input optical signals; and (B) launching the first and second input optical signals to propagate along one or more of the one or more input optical waveguides in one or more propagating input optical modes and around the ring optical resonator in one or more resonant optical modes, resulting in generation of the output electromagnetic signal.

This disclosure is illustrative and not limiting. Further modifications will be apparent to one skilled in the art in light of this disclosure and are intended to fall within the scope of the present disclosure or appended claims. It is intended that equivalents of the disclosed example apparatus and methods, or modifications thereof, shall fall within the scope of the present disclosure or appended claims.

In the foregoing Detailed Description, various features may be grouped together in several examples for the purpose of streamlining the disclosure. This method of disclosure is not to be interpreted as reflecting an intention that any claim requires more features than are expressly recited therein. Rather, as the appended claims reflect, inventive subject matter may lie in less than all features of a single disclosed example. Therefore, the present disclosure shall be construed as implicitly disclosing any embodiment having any suitable subset of one or more features—which features are shown, described, or claimed in the present application— including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed example. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each. In another example, each of "a dog, a cat, or a mouse," "one or more of a dog, a cat, or a mouse," and "one or more dogs, cats, or mice" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. In another example, each of "two or more of a dog, a cat, or a mouse" or "two or more dogs, cats, or mice" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:
1. An apparatus comprising:
(a) a substrate;
(b) a ring optical resonator on the substrate, the ring optical resonator being arranged so as to support one or more resonant optical modes; and
(c) an input optical waveguide on the substrate, the input optical waveguide being arranged so as to support one or more propagating input optical modes, the input optical waveguide and the ring optical resonator being arranged and positioned so as to establish evanescent optical coupling therebetween,

(d) the ring optical resonator, the substrate, or both including one or more nonlinear optical materials, (e) the ring optical resonator and the input optical waveguide being arranged so as to generate, from (i) an input optical signal at an input optical frequency $\nu_{IN}$ propagating along the input optical waveguide in one or more propagating input optical modes and around the ring optical resonator in one or more resonant optical modes and (ii) a millimeter-wave or sub-millimeter-wave electromagnetic signal at an electromagnetic frequency $\nu_{EM}$ incident on the ring optical resonator, one or more sideband optical signals that propagate around the ring optical resonator at corresponding optical sideband frequencies $\nu_{SF}=\nu_{IN}+\nu_{EM}$ or $\nu_{DF}=\nu_{IN}-\nu_{EM}$.

2. The apparatus of claim 1 wherein the input optical frequency $\nu_{IN}$ corresponds to a vacuum wavelength between 0.8 μm and 1.7 μm.

3. The apparatus of claim 1 wherein the electromagnetic frequency $\nu_{EM}$ is between 0.030 THz and 0.30 THz.

4. The apparatus of claim 1 wherein the electromagnetic frequency $\nu_{EM}$ is between 0.30 THz and 30. THz.

5. The apparatus of claim 1 wherein: (i) the substrate includes one or more nonlinear optical materials at or on a surface thereof, and the ring optical resonator comprises a ridge optical waveguide formed on the surface of the substrate, or (ii) the ring optical resonator comprises a ridge optical waveguide formed on a surface of the substrate and includes one or more nonlinear optical materials.

6. The apparatus of claim 1 further comprising an optical detector arranged so as to receive at least a portion of the one or more sideband optical signals and generate therefrom one or more corresponding electrical signals indicative of presence or intensity of the electromagnetic signal.

7. The apparatus of claim 6 further comprising a signal processing system connected to the optical detector, the signal processing system being structured and connected so as to receive the one or more electrical signals, demodulate the one or more electrical signals, and decode transmitted information encoded by modulation of the electromagnetic signal.

8. The apparatus of claim 7 wherein the signal processing system is arranged so as to decode the transmitted information at a data rate greater than $5 \times 10^9$ bps.

9. The apparatus of claim 6 further comprising one or more polarization-selective optical components or one or more wavelength-selective optical components positioned and arranged so as to (i) selectively direct or transmit portions of one or more of the sideband optical signals to propagate to the optical detector and (ii) selectively reduce direction or transmission of the input optical signal propagating to the optical detector.

10. The apparatus of claim 1 further comprising: (i) an output optical waveguide on the substrate, the output optical waveguide being arranged so as to support one or more propagating output optical modes, the output optical waveguide and the ring optical resonator being arranged and positioned so as to establish evanescent optical coupling therebetween that results in at least a portion of one or more of the generated sideband optical signals propagating along the output optical waveguide; and (ii) an auxiliary ring optical resonator on the substrate, the auxiliary ring optical resonator being arranged so as to support one or more auxiliary resonant optical modes, the auxiliary ring optical resonator being arranged and positioned so as to establish evanescent optical coupling with the ring optical resonator and with the output optical waveguide, resulting in the evanescent optical coupling between the ring optical resonator and the output optical waveguide.

11. The apparatus of claim 1, one or more of the resonant optical modes having a corresponding resonant optical frequency about equal to $\nu_{IN}$, $\nu_{SF}$, or $\nu_{DF}$.

12. The apparatus of claim 1, the ring optical resonator exhibiting a free spectral range about equal to $\nu_{EM}$ or $\nu_{EM}/N$ where N is an integer.

13. The apparatus of claim 1 further comprising one or more electrodes on the substrate that are positioned and arranged relative to the ring optical resonator so that resonant optical frequencies of the resonant optical modes vary according to corresponding voltages applied to the one or more electrodes.

14. The apparatus of claim 1 further comprising an input optical source positioned and arranged so as to generate the input optical signal and launch the input optical signal to propagate along the input optical waveguide, the input optical source being a laser source that is frequency-locked to a corresponding resonant optical mode of the ring optical resonator.

15. The apparatus of claim 1 further comprising one or more electrically conductive traces on the substrate arranged as an antenna for the electromagnetic signal and positioned relative to the ring optical resonator so as to enhance generation of the one or more sideband optical signals.

16. The apparatus of claim 1 further comprising a one- or two-dimensional array of additional ring optical resonators on the substrate and, for each additional optical resonator of the array, a corresponding additional input optical waveguide positioned for evanescent optical coupling between that resonator of the array and the corresponding input optical waveguide, each additional ring optical resonator and corresponding additional input optical waveguide being arranged so as to generate, from (i) one or more corresponding portions of the input optical signal at the input optical frequency $\nu_{IN}$ propagating along one or more of the additional input optical waveguides and around the corresponding additional ring optical resonators and (ii) the electromagnetic signal at the electromagnetic frequency $\nu_{EM}$ incident on one or more of the additional ring optical resonators, one or more additional sideband optical signals that propagate around the corresponding additional ring optical resonators at the corresponding optical sideband frequencies $\nu_{SF}=\nu_{IN}+\nu_{EM}$ or $\nu_{DF}=\nu_{IN}-\nu_{EM}$.

17. The apparatus of claim 16 further comprising multiple optical detectors, each arranged for receiving a corresponding sideband optical signal generated at a corresponding additional optical resonator so that the resonators and optical detectors act together as an imaging array for the incident electromagnetic signal.

18. A method for using the apparatus of claim 6, the method comprising:

(A) positioning the substrate or directing the electromagnetic signal so that the electromagnetic signal is incident on at least a portion of the ring optical resonator;

(B) launching the input optical signal to propagate along the input optical waveguide in one or more propagating input optical modes and around the ring optical resonator in one or more resonant optical modes, resulting in generation of the one or more sideband optical signals that propagate around the ring optical resonator at the corresponding optical sideband frequencies $\nu_{SF}$ or $\nu_{DF}$; and (C) receiving with the optical detector at least a portion of the one or more sideband optical signals and generating therefrom a corresponding electrical signal indicative of presence or intensity of the electromagnetic signal.

19. A method for using the apparatus of claim 7, the method comprising:
(A) positioning the substrate or directing the electromagnetic signal so that the electromagnetic signal is incident on at least a portion of the ring optical resonator;
(B) launching the input optical signal to propagate along the input optical waveguide in one or more propagating input optical modes and around the ring optical resonator in one or more resonant optical modes, resulting in generation of the one or more sideband optical signals that propagate around the ring optical resonator at the corresponding optical sideband frequencies $v_{SF}$ or $v_{DF}$;
(C) receiving with the optical detector at least a portion of the one or more sideband optical signals and generating therefrom a corresponding electrical signal indicative of presence or intensity of the electromagnetic signal; and
(D) using the signal processing system, demodulating the one or more electrical signals, and decoding transmitted information encoded by modulation of the electromagnetic signal.

20. A method for using the apparatus of claim 17, the method comprising:
(A) positioning the substrate or directing the electromagnetic signal so that the electromagnetic signal is incident on one or more of the additional ring optical resonators;
(B) launching the input optical signal to propagate along one or more of the additional input optical waveguides and around the corresponding additional ring optical resonators, resulting in generation of the one or more additional sideband optical signals that propagate around the corresponding additional ring optical resonators at the corresponding optical sideband frequencies $v_{SF}$ or $v_{DF}$; and
(C) receiving with one or more of the multiple optical detectors corresponding portions of the one or more additional sideband optical signals and generating therefrom corresponding electrical signals collectively indicative of at least a portion of an image of the electromagnetic signal.

21. An apparatus comprising:
(a) a substrate;
(b) a ring optical resonator on the substrate, the ring optical resonator being arranged so as to support one or more resonant optical modes; and
(c) one or more input optical waveguides on the substrate, each input optical waveguide being arranged so as to support one or more corresponding propagating input optical modes, each input optical waveguide and the ring optical resonator being arranged and positioned so as to establish evanescent optical coupling therebetween,
(d) the ring optical resonator, the substrate, or both including one or more nonlinear optical materials,
(e) the ring optical resonator and one or more of the one or more input optical waveguides being arranged so as to generate, from first and second input optical signals at respective input optical frequencies $v_{IN1}$ and $v_{IN2}$ propagating along one or more of the one or more input optical waveguides in one or more propagating input optical modes and around the ring optical resonator in one or more resonant optical modes, a millimeter-wave or sub-millimeter-wave electromagnetic signal that propagates away from the optical resonator at an electromagnetic frequency $v_{EM}$, with $v_{EM} = |v_{IN1} - v_{IN2}|$.

22. The apparatus of claim 21 wherein the input optical frequencies $v_{IN1}$ and $v_{IN2}$ correspond to vacuum wavelengths between 0.8 μm and 1.7 μm.

23. The apparatus of claim 21 wherein the electromagnetic frequency $v_{EM}$ is between 0.030 THz and 0.30 THz.

24. The apparatus of claim 21 wherein the electromagnetic frequency $v_{EM}$ is between 0.30 THz and 30. THz.

25. The apparatus of claim 21 wherein (i) the substrate includes one or more nonlinear optical materials at or on a surface thereof, and the ring optical resonator comprises a ridge optical waveguide formed on the surface of the substrate, or (ii) the ring optical resonator comprises a ridge optical waveguide formed on a surface of the substrate and including one or more nonlinear optical materials.

26. The apparatus of claim 21 further comprising a modulation system operatively coupled to one or more of the resonator, a source of the first input optical signal, or a source of the second input optical signal, the modulation system being structured and connected so as to receive one or more electrical signals modulated to encode transmitted information and to modulate the electromagnetic output signal to encode the transmitted information.

27. The apparatus claim 26 wherein the modulation system is arranged so as to encode the transmitted information at a data rate greater than $5 \times 10^9$ bps.

28. The apparatus of claim 26 wherein (i) the modulation system is operatively coupled to one or both of the sources of the first and second input optical signals and arranged so as to modulate one or both of the first or second input optical signals to effect modulation of the output electromagnetic signal, or (ii) the modulation system is operatively coupled to the optical resonator and arranged so as to modulate one or more characteristics of the optical resonator to effect modulation of the output electromagnetic signal.

29. The apparatus of claim 21, at least one of the resonant optical modes having a corresponding resonant optical frequency about equal to $v_{IN1}$ or about equal to $v_{IN2}$.

30. The apparatus of claim 21, the ring optical resonator exhibiting a free spectral range about equal to $v_{EM}$ or $v_{EM}/N$ where N is an integer.

31. The apparatus of claim 21 further comprising one or more electrodes on the substrate that are positioned and arranged relative to the ring optical resonator so that resonant optical frequencies of the resonant optical modes vary according to corresponding voltages applied to the one or more electrodes.

32. The apparatus of claim 21 further comprising respective first and second input optical sources positioned and arranged so as to generate the first and second input optical signals and launch the first and second input optical signal to propagate along either (i) the same waveguide of the one or more input optical waveguides, or (ii) different waveguides of the one or more input optical waveguides.

33. The apparatus of claim 32, at least one of the input optical sources being a laser source that is frequency-locked to a corresponding resonant optical mode of the ring optical resonator.

34. The apparatus of claim 21 further comprising one or more electrically conductive traces on the substrate arranged as an antenna for the output electromagnetic signal and positioned relative to the ring optical resonator so as to enhance or direct generation of the output electromagnetic signal.

35. The apparatus of claim 21 further comprising a one- or two-dimensional array of additional ring optical resonators on the substrate and, for each additional optical resonator of the array, corresponding one or more additional input optical waveguides positioned for evanescent optical coupling between that resonator of the array and the corresponding one or more input optical waveguides, each additional ring optical resonator and corresponding additional input optical waveguide being arranged so as to generate, from first and second input optical signals at respective input optical frequencies $v_{IN1}$ and $v_{IN2}$ propagating along one or more of the one or more additional input optical waveguides in one or more propagating input optical modes and around the ring optical resonator in one or more resonant optical modes, a millimeter-wave or sub-millimeter-wave electromagnetic signal at an electromagnetic frequency $v_{EM}$, with $v_{EM} = |v_{IN1} - v_{IN2}|$.

36. A method for using the apparatus of claim 35, the method comprising either (i) selectively activating certain optical resonators of the array to emit corresponding output electromagnetic signals that collectively form an image, or (ii) operating the array so that the resonators emit corresponding output electromagnetic signals that exhibit corresponding relative phases that vary with position across the array, the varying relative phases resulting in combined output electromagnetic signals exhibiting a corresponding directionality of propagation away from the array.

37. A method for using the apparatus of claim 21, the method comprising launching the first and second input optical signals to propagate along one or more of the one or more input optical waveguides in one or more propagating input optical modes and around the ring optical resonator in one or more resonant optical modes, resulting in generation of the output electromagnetic signal that propagates away from the optical resonator.

38. A method for using the apparatus of claim 26, the method comprising:
(A) launching the first and second input optical signals to propagate along one or more of the one or more input optical waveguides in one or more propagating input optical modes and around the ring optical resonator in one or more resonant optical modes, resulting in generation of the output electromagnetic signal; and
(B) using the modulation system, in response to receiving one or more electrical signals modulated to encode transmitted information, modulating one or more of the first input optical signal, the second input optical signal, or one or more characteristics of the optical resonator, so as to effect modulation of the output electromagnetic signal to encode the transmitted information.

* * * * *